United States Patent
Okuni et al.

(10) Patent No.: US 12,111,423 B2
(45) Date of Patent: Oct. 8, 2024

(54) ELECTRONIC APPARATUS AND METHOD

(71) Applicant: KABUSHIKI KAISHA TOSHIBA, Minato-ku (JP)

(72) Inventors: Hidenori Okuni, Yokohama (JP); Tuan Thanh Ta, Kawasaki (JP); Satoshi Kondo, Kawasaki (JP); Akihide Sai, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 834 days.

(21) Appl. No.: 16/564,840

(22) Filed: Sep. 9, 2019

(65) Prior Publication Data

US 2020/0300988 A1    Sep. 24, 2020

(30) Foreign Application Priority Data

Mar. 18, 2019    (JP) .................................. 2019-050177

(51) Int. Cl.
  *G01S 7/48*     (2006.01)
  *G01S 7/4863*   (2020.01)
  *G01S 7/4865*   (2020.01)
  *G01S 17/10*    (2020.01)

(52) U.S. Cl.
  CPC .......... *G01S 7/4865* (2013.01); *G01S 7/4808* (2013.01); *G01S 7/4863* (2013.01); *G01S 17/10* (2013.01)

(58) Field of Classification Search
  USPC ........................................................ 356/5.01
  See application file for complete search history.

(56) References Cited

U.S. PATENT DOCUMENTS

| 6,934,012 B2 | 8/2005 | Inaba et al. | |
| 8,362,890 B2 | 1/2013 | Takeichi et al. | |
| 2004/0070748 A1* | 4/2004 | Inaba | G01S 17/10 356/5.01 |
| 2010/0066534 A1* | 3/2010 | Takeichi | G01S 7/527 340/540 |
| 2011/0058167 A1* | 3/2011 | Knox | H04N 7/18 356/338 |

(Continued)

FOREIGN PATENT DOCUMENTS

| EP | 2191298 B1 * | 11/2013 | ............. G01S 17/10 |
| JP | 7-244154 A | 9/1995 | |

(Continued)

OTHER PUBLICATIONS

English Machine Translation of EP 2,191,298 (Year: 2013).*

*Primary Examiner* — James R Hulka
(74) *Attorney, Agent, or Firm* — Oblon, McClelland, Maier & Neustadt, L.L.P.

(57) ABSTRACT

An electronic apparatus capable of determining a distance to an object based on reflected light provided by a reflection of a pulsed light on the object includes an input terminal configured to receive a signal of intensity of reception light. Processing circuitry determines a measurement range capable of specifying a peak of the reception light based on the intensity of the reception light, detects the reflected light by specifying the peak of the reception light within the measurement range, determines, based on the measurement range, a duration from when the pulsed light is emitted until when the reflected light is received, and determines a distance from the electronic apparatus to the object according to the duration.

21 Claims, 17 Drawing Sheets

(56) References Cited

U.S. PATENT DOCUMENTS

| | | | |
|---|---|---|---|
| 2012/0075615 A1* | 3/2012 | Niclass | G01S 7/489 356/5.01 |
| 2016/0061952 A1* | 3/2016 | Tsuji | G01S 17/88 356/5.01 |
| 2016/0200161 A1* | 7/2016 | Van Den Bossche | G01S 17/89 250/206 |
| 2017/0242108 A1* | 8/2017 | Dussan | G01S 7/4868 |
| 2018/0231646 A1* | 8/2018 | Schrey | G01S 7/4863 |
| 2018/0247968 A1* | 8/2018 | Na | H01L 27/14634 |
| 2018/0259629 A1* | 9/2018 | Oohata | G01S 17/10 |
| 2018/0284229 A1* | 10/2018 | Liu | H03G 3/3084 |
| 2018/0284244 A1* | 10/2018 | Russell | G01S 7/484 |
| 2018/0284247 A1* | 10/2018 | Campbell | G01S 17/10 |
| 2018/0284279 A1* | 10/2018 | Campbell | G01S 7/4816 |
| 2018/0306926 A1* | 10/2018 | LaChapelle | G01J 1/44 |
| 2020/0284883 A1* | 9/2020 | Ferreira | G01S 7/4817 |

FOREIGN PATENT DOCUMENTS

| | | |
|---|---|---|
| JP | 8-122435 A | 5/1996 |
| JP | 10-253760 A | 9/1998 |
| JP | 2002-328169 A | 11/2002 |
| JP | 2005-189140 A | 7/2005 |
| JP | 2007-225342 A | 9/2007 |
| JP | 2010-66199 A | 3/2010 |
| JP | 4567327 B2 | 10/2010 |
| JP | 4587327 B2 | 10/2010 |
| JP | 2012-107984 A | 6/2012 |
| JP | 2013-19684 A | 1/2013 |
| JP | 2018-40656 A | 3/2018 |
| WO | WO-2009043685 A1 * | 4/2009 ............ G01S 17/10 |
| WO | WO-2010149593 A1 * | 12/2010 ............ G01S 17/10 |

* cited by examiner

ELECTRONIC APPARATUS AND METHOD

CROSS REFERENCE TO RELATED APPLICATIONS

This application is based upon and claims the benefit of priority from the prior Japanese Patent Application No. 2019-50177, filed on Mar. 18, 2019, the entire contents of which are incorporated herein by reference.

FIELD

Embodiments of the present invention relate to an electronic apparatus and a method for measuring distance.

BACKGROUND

There has been developed an electronic apparatus that measures, using a time from emission of light to reception of reflected light reflected by an object, a distance to the object. An electronic apparatus capable of suppressing influence of ambient light and improving accuracy in measuring a distance to the object is desired.

DETAILED DESCRIPTION

According to an embodiment of the present disclosure, an electronic apparatus capable of determining a distance to an object based on reflected light provided by a reflection of a pulsed light on the object, includes:
an input terminal configured to receive a signal of intensity of reception light;
processing circuitry configured to:
determine a measurement range capable of specifying a peak of the reception light based on the intensity of the reception light;
detect the reflected light by specifying the peak of the reception light within the measurement range;
determine, based on the measurement range, a duration from when the pulsed light is emitted until when the reflected light is received, and
determine a distance from the electronic apparatus to the object according to the duration.

Hereinafter, embodiments for carrying out the invention will be described.

First Embodiment

Figure 1:
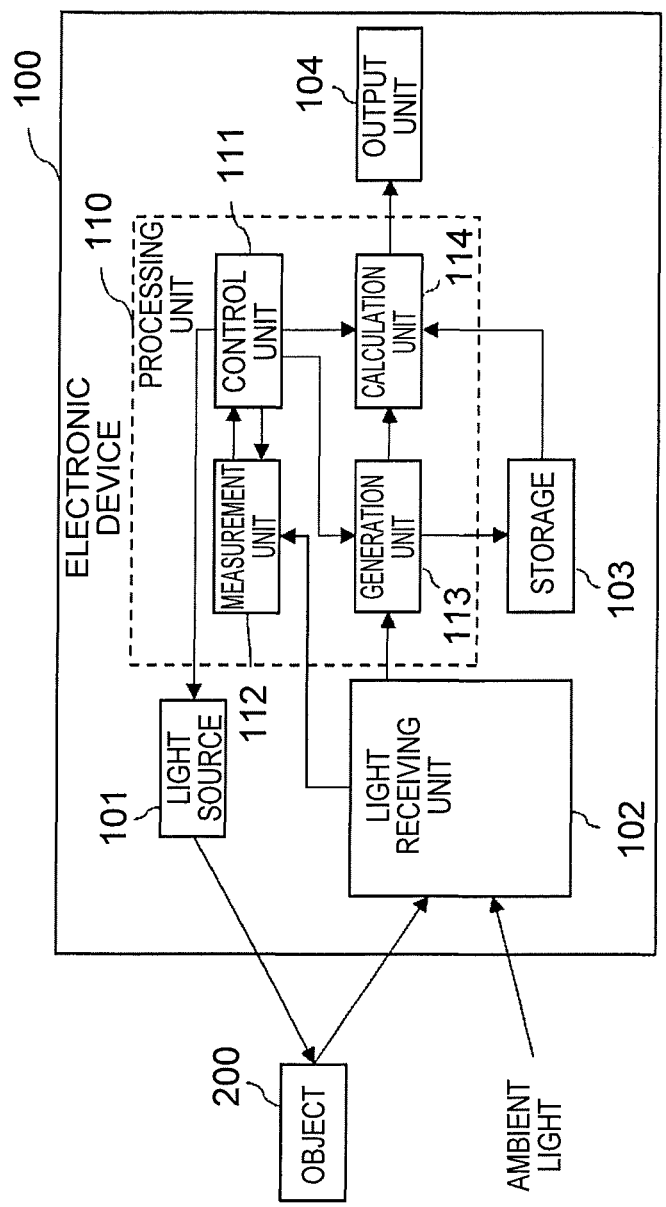
FIG. 1 is a diagram of a distance measurement system including an electronic apparatus according to a first embodiment.

FIG. 1 illustrates a distance measurement system according to the present embodiment. In the distance measurement system, an electronic apparatus 100 is an electronic apparatus that measures a distance to an object 200.

The electronic apparatus 100 includes a light source 101, a light receiving unit 102, and a processing unit (processing circuitry) 110. The light source 101 emits an electromagnetic wave having a duration of time to the object 200. The duration of time will be hereinafter referred to as a pulse width, and the electromagnetic wave will be hereinafter referred to as pulsed light. The pulsed light is reflected by the object 200, and a part ((hereinafter also referred to as reflected light) of the reflected pulsed light is received by the light receiving unit 102. The processing unit 110 calculates a time (time of flight: hereinafter also referred to as ToF) from the emission of the pulsed light to the reception of the reflected light.

On the basis of the ToF, the processing unit 110 calculates a distance d between the electronic apparatus 100 and the object 200 according to the following formula (1).

$$d = \frac{T_o F}{2} \cdot c \qquad (1)$$

Here, c represents the speed of light (approximately $3 \times 10^8$ m/s).

Accuracy of the ToF needs to be improved to improve accuracy of the distance d. However, as illustrated in FIG. 1, the light receiving unit 102 also receives light other than the reflected light. That is, for example, light (lighting or lighting of a lamp) emitted by a device other than the electronic apparatus 100, light derived from sunlight, and the like. Hereinafter, the light other than the reflected light will be referred to as ambient light.

The influence of the ambient light needs to be reduced to improve the accuracy of the ToF. The electronic apparatus 100 according to the present embodiment first measures intensity of the ambient light. The electronic apparatus 100 determines, on the basis of the intensity of the ambient light, a time range (hereinafter referred to as data generation range) in which data for calculating ToF is generated. The electronic apparatus 100 determines the reflected light on the basis of the intensity of light within the data generation range, and calculates ToF on the basis of the time at which the reflected light is received. The electronic apparatus 100 calculates the distance d on the basis of the calculated ToF and the formula (1).

Accordingly, the electronic apparatus 100 can determine the reflected light while reducing the influence of the ambient light, whereby the accuracy of ToF can be improved. In other words, the electronic apparatus 100 is capable of calculating the distance d highly accurately.

The electronic apparatus 100 includes a storage 103 and an output unit 104 in addition to the light source 101, the light receiving unit 102, and the processing unit 110. The processing unit 110 includes a control unit 111, a measurement unit 112, a generation unit 113, and a calculation unit 114. The processing unit 110 determines a measurement range capable of specifying a peak of the reception light based on the intensity of the reception light, detects the reflected light by specifying the peak of the reception light within the measurement range, determines, based on the measurement range, a duration from when the pulsed light is emitted until when the reflected light is received, and determines a distance from the electronic apparatus to the object according to the duration. More specifically, the processing unit 110 determines a threshold value for judging whether or not the reflected light is received based on the intensity of the reception light, and specifies the peak of the reception light by comparing the intensity of the reception light and the threshold value.

The light source 101 is a device that receives a command from the control unit 111 and emits pulsed light to the object 200. For example, the light source 101 may be a combination of a laser light source, such as a laser diode, and a circuit that generates a pulse. The light source 101 may also be a combination of a light emitting diode (LED) or various lamps and the circuit that generates a pulse.

Furthermore, there is no limitation on a frequency band of the pulsed light emitted by the light source 101. The pulsed light may be, for example, visible light, infrared light, near-infrared light, ultraviolet light, or a combination thereof. As an example, the pulsed light in the present embodiment is assumed to include a visible light component.

Furthermore, there is no limitation on a shape of the pulsed light emitted by the light source 101. It may be rectangular, triangular, a shape of a sinc function, or a shape of a Gaussian curve.

Examples of the command that the light source 101 receives from the control unit 111 include a pulse width (e.g., 10 ns) and a shape of the pulsed light to be emitted, and a timing and a direction for emitting the pulsed light.

The pulsed light emitted by the light source 101 is reflected by the object 200, and is made incident on the light receiving unit 102 as reflected light. The reflected light may be either diffused reflected light or specular reflected light of the pulsed light on the object 200, or may be a combination thereof.

The light receiving unit 102 receives light, and outputs signals indicating the intensity of the received light. The signals are transmitted to the measurement unit 112, and are used to measure the intensity of ambient light. The signals are also transmitted to the generation unit 113, and are used to generate data (hereinafter referred to as light intensity data) indicating the light intensity with respect to time. While examples of an index indicating the light intensity may be various, such as luminance, illuminance, and the number of photons, in the present embodiment, the number of photons is taken as an example.

Any type of device can be adopted as the light receiving unit 102 as long as it is capable of detecting light (including an electromagnetic wave). For example, it may be photodiodes, photomultiplier tubes, and the like. An avalanche photo diode (APD) having high detection sensitivity of light may be used as the photodiode. The APD may be used in the Geiger mode. A multi-pixel photon counter (MPPC) may be used as an array of the APD. Furthermore, a silicon photomultiplier (SiPM) may be used as the photomultiplier tube. In the present embodiment, it is assumed that the APD is used in the Geiger mode as an example. The APD outputs signals indicating the light intensity on the basis of the number of photons of the received light.

The light receiving unit 102 receives light and outputs signals indicating the intensity of light on the basis of the number of received photons, and does not distinguish the light to be received. That is, the light receiving unit 102 does not distinguish between the reflected light and the ambient light.

Note that the reflected light is light obtained by the pulsed light being reflected by the object 200, which does not include light obtained by the ambient light being reflected by the object 200, and is classified as the ambient light.

Further, the signals output from the light receiving unit 102 are digitized via a converter (not illustrated), and are input to the measurement unit 112 and the generation unit 113. Any converter can be used as the converter, such as an A/D converter, a sampler circuit, a digital filter, and a device that performs equalization processing.

The storage 103 is an electronic apparatus that retains information. In the present embodiment, for example, the light intensity data generated by the generation unit 113 is retained.

The storage 103 is a memory or the like, which is, for example, a random access memory (RAM), a read-only memory (ROM), a programmable ROM (PROM), an erasable PROM (EPROM), an electrically EPROM (EEPROM), a flash memory, a register, or the like.

The control unit 111 transmits commands to the light source 101, the measurement unit 112, the generation unit 113, and the calculation unit 114. The commands are at least partially determined on the basis of the intensity of the ambient light received by the control unit 111 from the measurement unit 112.

The command to the light source 101 is, for example, a pulse width (e.g., 10 ns) and a shape of the pulsed light to be emitted, time and a direction to start the emission of the pulsed light, and the like. The command to the measurement unit 112 is the time at which the measurement of the intensity in the ambient light starts, a measurement time of the intensity in the ambient light, and the like. The command to the generation unit 113 is, for example, the data generation range and the like. The command to the calculation unit 114 is a threshold value of the intensity of the light determined to be reflected light, and the like.

In the command transmitted by the control unit 111 to the light source 101 and the measurement unit 112, the time at which the emission of the pulsed light starts coincides with the start time of the data generation range as an example in the present embodiment. This coincidence includes a time lag that does not affect the calculation of ToF. In addition, this coincidence includes, in a case where there is a delay or the like in the route for transmitting each command, a time lag in consideration of the delay.

The measurement unit 112 estimates the intensity of the ambient light from the command transmitted from the control unit 111 and the signals indicating the intensity of the light transmitted from the light receiving unit 102. In the present embodiment, as an example, the measurement unit 112 measures the average value of the intensity of light within a fixed period transmitted from the control unit 111, and estimates it as the intensity of the ambient light. A command related to the estimation of the intensity of the ambient light including the fixed period is transmitted from the control unit 111. The estimated intensity of the ambient light is transmitted to the control unit 111, and is used to determine at least a part of the commands.

The generation unit 113 generates the light intensity data on the basis of the signals indicating the intensity of light transmitted from the light receiving unit 102 and the command from the control unit 111. The light intensity data is data indicating the light intensity with respect to time. A width of time in the light intensity data is optional, and is set in the generation unit 113. In the present embodiment, as an example, the generation unit 113 generates the light intensity data indicating the light intensity at 1 ns intervals. The light intensity data is used by the calculation unit 114 to calculate ToF. The generation unit 113 causes the storage 103 to retain the light intensity data together with time.

The calculation unit 114 determines the time at which the reflected light is received on the basis of the light intensity data retained in the storage 103 and the threshold value transmitted from the control unit 111. Specifically, the calculation unit 114 determines, among the light intensity data, data with the highest light intensity to be reflected light, and determines that time to be the time at which the reflected light is received. The data with the highest light intensity may include quasi-highest data. The calculation unit 114 calculates ToF on the basis of the determined time at which the reflected light is received.

The calculation unit 114 calculates the distance d between the electronic apparatus 100 and the object 200 on the basis of the calculated ToF and the formula (1). The distance d is transmitted to the output unit 104. The transmission of the distance d to the output unit 104 may be performed on the basis of the command from the control unit 111.

The output unit 104 outputs information including the distance d transmitted from the calculation unit 114. An output destination is not limited, and may be a device and a system that operate at least on the basis of the distance d, an electronic apparatus including a display, a storage device (not illustrated) that retains the distance d, and the like. Note that those devices and systems may be inside or outside the electronic apparatus 100. In addition, a format of information indicating the distance d is not limited, and may be a format that can be used as data, text, a two-dimensional drawing, a three-dimensional drawing, and the like. Moreover, an output format may be wired or wireless.

The processing unit 110 including the control unit 111, the measurement unit 112, the generation unit 113, and the calculation unit 114 is electronic circuitry (processor) including an arithmetic device and a controller of hardware. Examples of the processor include a general-purpose processor, a central processing unit (CPU), a microprocessor, a digital signal processor (DSP), and a combination thereof.

The components of the electronic apparatus 100 have been described above. The connection between the components may be wired or wireless. Furthermore, the electronic apparatus 100 is mounted as integrated circuitry, such as an integrated circuit (IC) and large scale integration (LSI). It may be collectively mounted on one chip, or a part of the components may be mounted on another chip.

In calculating the distance d, the electronic apparatus 100 determines the data generation range that is a time range in which the generation unit 113 generates the light intensity data on the basis of the intensity of the ambient light. The electronic apparatus 100 determines the data generation range to be narrower as the intensity of the ambient light increases, and determines the data generation range to be wider as the intensity of the ambient light decreases.

In a case where the intensity of the ambient light is high, there is a high possibility that the electronic apparatus 100 receives the ambient light with the intensity to be erroneously determined to be reflected light. In that case, the electronic apparatus 100 determines the data generation range to be narrower, thereby reducing the possibility.

On the other hand, in a case where the intensity of the ambient light is low, it is less likely that the electronic apparatus 100 receives the ambient light with the intensity to be erroneously determined to be reflected light. In that case, the electronic apparatus 100 determines the data generation range to be wider, whereby the distance d can be calculated even in the case where the electronic apparatus 100 is away from the object 200. As described, in the case where the received light intensity is second intensity larger than first intensity, the processing unit 110 determines the time range (data generation range) as a second time range narrower than a first time range corresponding to the first intensity.

The electronic apparatus 100 calculates ToF to calculate the distance d from the determined data generation range. The operation of calculating the distance d performed by the electronic apparatus 100 according to the present embodiment will be described with reference to FIGS. 2 and 3.

Figure 2:
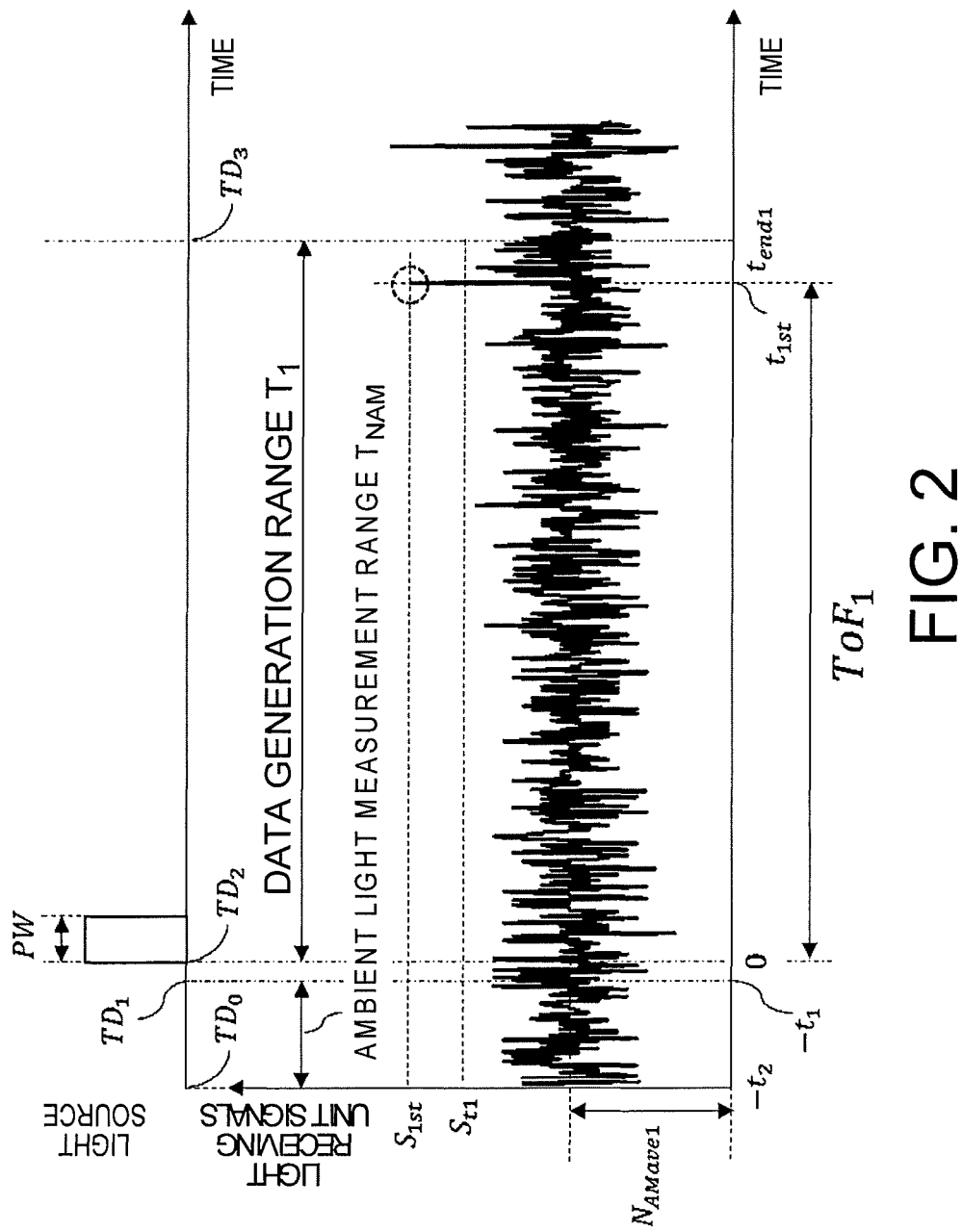
FIG. 2 is a diagram for illustrating emission of pulsed light by a light source and signals output from a light receiving unit.

FIG. 2 illustrates the emission of the pulsed light by the light source 101 and the intensity of light output from the light receiving unit 102 at each time. The signals output from the light receiving unit 102 indicate the intensity of light received by the light receiving unit 102. Note that the intensity of light illustrated in FIG. 2 is assumed to be digitized.

Figure 3:
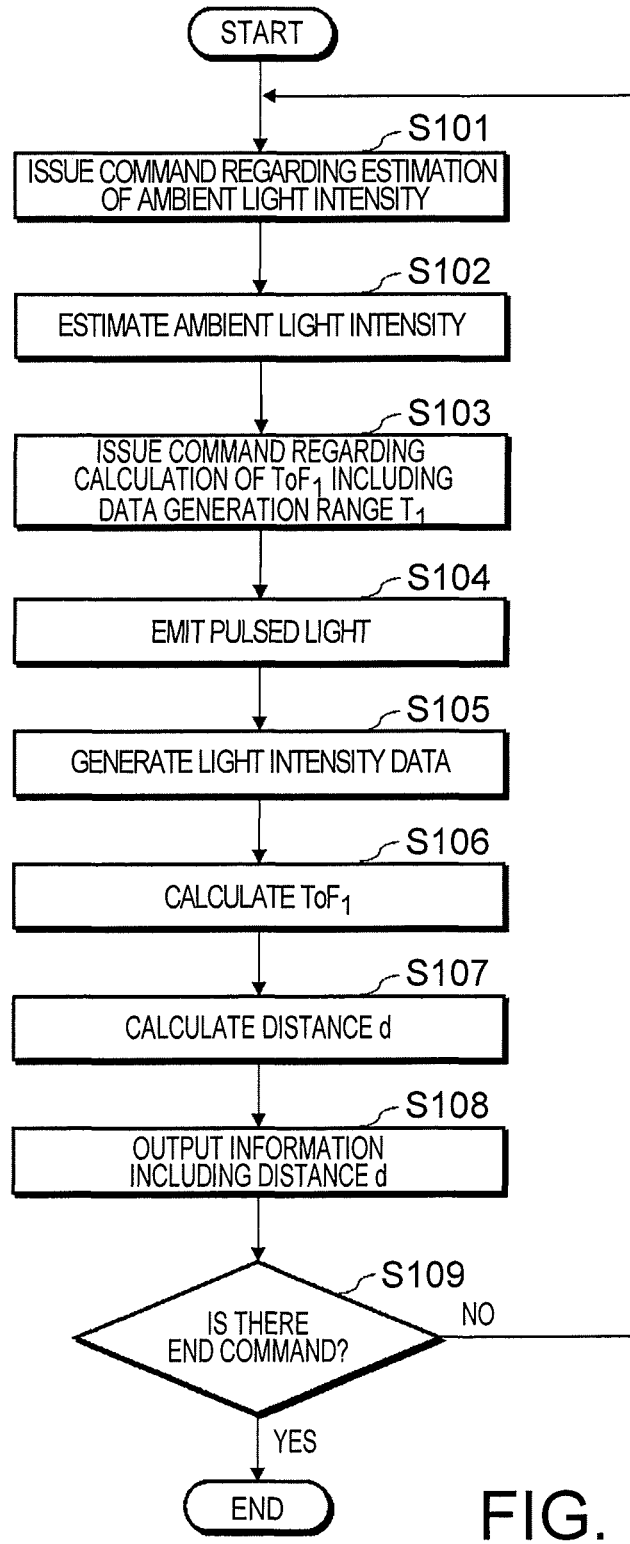
FIG. 3 is a flowchart of operation of the electronic apparatus according to the first embodiment.

FIG. 3 is a flowchart of the operation of the electronic apparatus 100 in calculating the distance d. Hereinafter, the operation of the electronic apparatus 100 will be described with reference to FIG. 2 and the flowchart of the operation.

Note that, in the present embodiment, the light receiving unit 102 receives light regardless of the flowchart of the operation to be described below. The light receiving unit 102 outputs signals indicating the intensity of the received light. The output signals are digitized, and are output to the measurement unit 112 and the generation unit 113. Hereinafter, the intensity of light will also be simply referred to as intensity. In addition, ToF in the present embodiment will be referred to as $ToF_1$.

First, operation of the electronic apparatus 100 until transmitting a command for calculating ToF will be described using steps S101 to S103. The electronic apparatus 100 estimates the intensity of the ambient light. The electronic apparatus 100 determines a command for calculating ToF including the data generation range and the threshold value on the basis of the intensity of the ambient light. The electronic apparatus 100 transmits the command for calculating ToF to the components of the electronic apparatus 100.

The control unit 111 commands the measurement unit 112 to estimate the intensity of the ambient light (step S101). FIG. 2 illustrates that the measurement unit 112 measures the light intensity in an ambient light measurement range $T_{NAM}$ from time $TD_0$ to time $TD_1$. The control unit 111 issues a command such that the average value of the light intensity in the ambient light measurement range $T_{NAM}$ is transmitted to the control unit 111 as the intensity of the ambient light.

The measurement unit 112 measures the light intensity transmitted from the light receiving unit 102 in response to the command in step S101 (step S102). The measurement unit 112 calculates an intensity average value NAMave1 obtained by averaging the light intensity transmitted from the light receiving unit 102 in the ambient light measurement range $T_{NAM}$. The measurement unit 112 estimates the intensity average value NAMave1 as the intensity of the ambient light, and transmits it to the control unit 111.

The control unit 111 determines at least a part of a command related to calculation of ToF including a data generation range T1 and a threshold value $S_{t1}$ of the intensity on the basis of the intensity of the ambient light (step S103). The control unit 111 transmits the determined command to the light source 101, the generation unit 113, and the calculation unit 114.

Specifically, the control unit 111 determines the data generation range T1 on the basis of the intensity of the ambient light. In FIG. 2, the data generation range T1 is represented as a time length $t_{end1}$ from time $TD_2$ to time $TD_3$. The control unit 111 commands the generation unit 113 to generate light intensity data in the data generation range T1.

Further, the control unit 111 issues commands regarding the pulse width and the shape of the pulsed light to be emitted by the light source 101, and the start time and the direction of the emission of the pulsed light. In the present embodiment, as an example, the control unit 111 commands the light source 101 to emit rectangular pulsed light with a pulse width PW at the start time $TD_2$ toward the direction in which the object 200 exists.

Further, the control unit 111 determines the threshold value $S_{t1}$ of the intensity on the basis of the intensity of the ambient light, and transmits it to the calculation unit 114. The threshold value $S_{t1}$ is set to a value highly likely to exceed in the case where the ambient light is received by the light receiving unit 102, and highly likely to fall below in the case where the reflected light is received. The calculation unit 114 can distinguish between the ambient light and the reflected light on the basis of the threshold value $S_{t1}$.

Next, operation of the electronic apparatus 100 until generating light intensity data will be described using steps S104 to S105. The electronic apparatus 100 emits pulsed light on the basis of the command for calculating ToF, and generates light intensity data indicating the light intensity in the data generation range.

The light source 101 emits pulsed light (step S104). FIG. 2 illustrates that the light source 101 emits pulsed light with the pulse width PW at the time $TD_2$. In the present embodiment, as an example, the generation unit 113 starts generation of the light intensity data at the time $TD_2$ same as that of the emission performed by the light source 101. The generation unit 113 generates the light intensity data with the time at which the generation of the light intensity data is started as time 0.

The pulsed light emitted from the light source 101 is at least partially reflected by the object 200 that is a distance measurement target, and is received by the light receiving unit 102 as reflected light.

The generation unit 113 continues the generation of the light intensity data started at the time $TD_2$ until the time $TD_3$ (step S105). The generation unit 113 causes the storage 103 to retain the generated light intensity data. That is, the light intensity data retained in the storage 103 is data of the time length $t_{end1}$ indicating the light intensity with respect to time from the time $TD_2$ to the time $TD_3$. After causing the storage 103 to retain the light intensity data in the data generation range T1, the generation unit 113 notifies the calculation unit 114 of the fact that the light intensity data is available.

Next, operation of the electronic apparatus 100 for calculating the distance d will be described using step S106 and subsequent steps. The electronic apparatus 100 determines the time at which the reflected light is received on the basis of the light intensity data. The electronic apparatus 100 calculates $ToF_1$ on the basis of the time at which the reflected light is received. The electronic apparatus 100 calculates and outputs the distance d on the basis of the calculated ToF.

The calculation unit 114 calculates $ToF_1$ using the threshold value $S_{t1}$ and the light intensity data retained in the storage 103 (step S106). The calculation of $ToF_1$ is carried out upon reception of the notification that the light intensity data is available from the generation unit 113. The calculation of $ToF_1$ is carried out after the time $TD_3$.

Specifically, the calculation unit 114 searches the light intensity data for data in which the threshold value $S_{t1}$ is exceeded and the light intensity is the highest. In the present embodiment, the calculation unit 114 determines that the data with the highest light intensity is data of the reflected light. In FIG. 2, intensity S1st is represented as the intensity of the reflected light. The calculation unit 114 determines that the time in the data of the reflected light is the time at which the light receiving unit 102 has received the reflected light. In FIG. 2, time $t_{1st}$ is represented as the time at which the reflected light is received.

The calculation unit 114 calculates, as $ToF_1$, a time from the time at which the pulsed light is emitted to the time at which the reflected light is received. In FIG. 2, $t_{1st}$ from the time 0 at which the pulsed light is emitted to the time $t_{1st}$ at which the reflected light is received is represented as $ToF_1$.

The calculation unit 114 calculates the distance d on the basis of the calculated $ToF_1$ and the formula (1) (step S107). The calculated distance d is transmitted to the output unit 104.

Next, the output unit 104 outputs information including the distance d transmitted from the calculation unit 114 (step S108). The output destination and the output format are not limited as described above.

Next, the control unit 111 checks whether or not an end command for terminating the operation of the electronic apparatus 100 has arrived (step S109). The end command is a command for terminating the operation of the electronic apparatus 100 in the present flow. The end command is transmitted to the control unit 111 by a user making input to the electronic apparatus 100, the electronic apparatus 100 obtaining signals including the end command, or the like. The end command may be a command for immediately terminating the operation of the electronic apparatus 100.

In the case where the end command has not arrived at the control unit 111 (No in step S109), the process returns to step S101. On the other hand, in the case where the end command has arrived at the control unit 111 (Yes in step S109), the flow is terminated, and the electronic apparatus 100 terminates the operation.

The foregoing has described the operation of the electronic apparatus 100 according to the present embodiment. The electronic apparatus 100 according to the present embodiment determines the data generation range according to the intensity of the ambient light. A case of intensity of ambient light different from that of FIG. 2 will be described with reference to FIG. 4.

Figure 4:
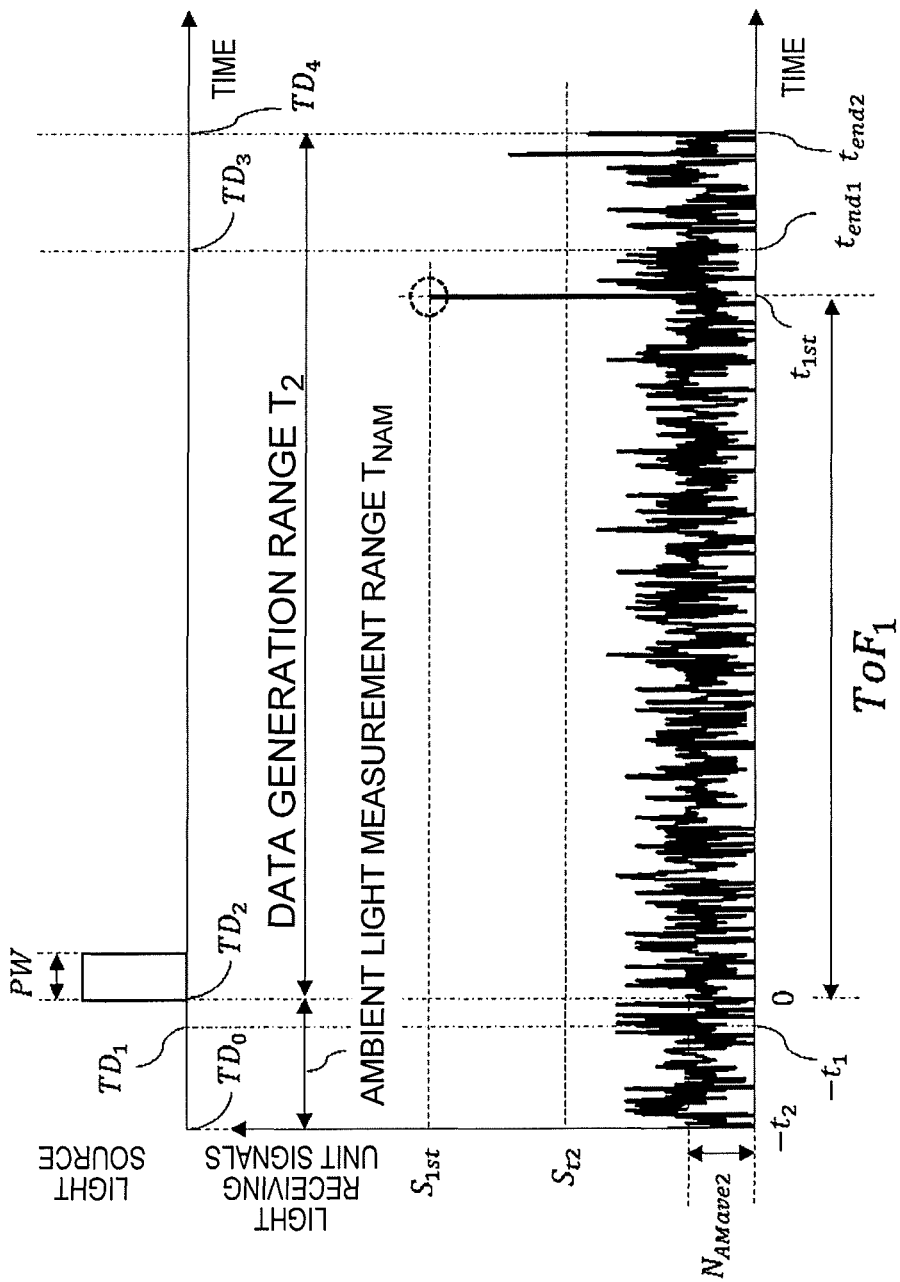
FIG. 4 is a diagram for illustrating the signals output from the light receiving unit and the emission of pulsed light by the light source at different ambient light intensity.

In a similar manner to FIG. 2, FIG. 4 illustrates the emission of the pulsed light by the light source 101 and the intensity of light output from the light receiving unit 102 at each time. The intensity of light output from the light receiving unit 102 indicates the intensity of light received by the light receiving unit 102. Note that the intensity of light illustrated in FIG. 4 is assumed to be digitized. In addition, a relationship of time in FIG. 4 is also assumed to be similar to that of FIG. 2.

Operation of the electronic apparatus 100 for calculation of the distance d in the case illustrated in FIG. 4 is similar to the operation described with reference to FIG. 3, and description thereof will be omitted.

The difference between FIG. 2 and FIG. 4 is the intensity of ambient light estimated by the measurement unit 112. In FIG. 4, the measurement unit 112 calculates an intensity average value NAMave2 in the ambient light measurement range $T_{NAM}$, and transmits it to the control unit 111 as the intensity of the ambient light. Here, the intensity average value NAMave2 in FIG. 4 is smaller than the intensity average value NAMave1 in FIG. 2.

The control unit 111 determines a data generation range T2 on the basis of the intensity average value NAMave2, and transmits it to the generation unit 113. The data generation range T2 is a time length $t_{end2}$ from the time $TD_2$ to time $TD_4$. The data generation range T1 in FIG. 2 is the time length $t_{end1}$ from the time $TD_2$ to the time $TD_3$. That is, the control unit 111 determines the data generation range to be wider as the intensity of the ambient light decreases. The reason therefor will be described below.

As illustrated in FIG. 2, in the case where the intensity of the ambient light is high (NAMave1), it is highly likely that strong ambient light is generated as data. That is, it is highly likely that ToF is erroneously calculated using the strong ambient light as reflected light. Therefore, the data generation range (T1) to be a target range for calculating ToF is determined to be narrower.

On the other hand, as illustrated in FIG. 4, in the case where the intensity of the ambient light is low (NAMave2), it is less likely that strong ambient light is generated as data. That is, it is less likely that ToF is erroneously calculated using the strong ambient light as reflected light. Therefore, it becomes possible to determine the data generation range (T2) to be a target range for calculating ToF to be wider.

As described above, the control unit 111 determines the data generation range on the basis of the intensity of the ambient light.

Further, the control unit 111 is capable of determining a threshold value $S_{t2}$ on the basis of the intensity average value NAMave2. The threshold value $S_{t1}$ in FIG. 4 is lower than the threshold value $S_{t1}$ in FIG. 2. The reason therefor is also similar to the reason described above.

Note that, since the relationship of time is made to be similar in FIGS. 2 and 4, the ToF calculated as a result is the same $ToF_1$.

Next, as the control unit 111 determines the data generation range on the basis of the intensity of the ambient light, an example of the determination of the data generation range will be described.

A case where the distance between the electronic apparatus 100 and the object 200 is d0 will be considered. The "d0" is not the distance d calculated by the electronic apparatus 100, but is an actual distance. Hereinafter, the distance d0 will also be referred to as a true value d0. In this case, the intensity of the reflected light of the pulsed light emitted by the light source 101 is NLD, and the intensity of the ambient light is NAM. Here, it can be considered that the reflected light intensity NLD changes according to the true value d0. Moreover, in the case where the intensity of the ambient light also changes according to the true value d0, an SNR, which is a ratio between the reflected light intensity NLD and the ambient light intensity NAM, is expressed as a formula (2).

$$SNR(d_0) = \frac{N_{LD}(d_0)}{N_{AM}(d_0)} \quad (2)$$

In the formula (2), in the case where the object 200 performs perfect diffuse reflection (Lambert reflection), NLD (d0) attenuates in proportion to the square of the true value d0. In addition, NAM (d0) is constant regardless of the true value d0. In this case, the SNR is rewritten as in a formula (3).

$$SNR(d_0) = \frac{\frac{N_{LD}(0)}{d_0^2}}{N_{AM}} \quad (3)$$

Here, NLD (0) represents the intensity of the reflected light in the case where the distance between the electronic apparatus 100 and the object 200 is zero. The intensity NLD (0) is determined on the basis of the intensity of the pulsed light emitted by the light source 101 and reflectivity of the object 200. That is, with the reflectivity of the object 200 being determined, the intensity NLD (0) can be determined. The reflectivity of the object 200 does not necessarily have to be accurate, and in the present embodiment, as an example, minimal reflectivity capable of obtaining the distance d is determined in advance, and is set as the reflectivity of the object 200.

Furthermore, the SNR is related to an error rate of distance measurement. The error rate of distance measurement is a ratio representing discrepancy between the distance d measured by the electronic apparatus 100 and the true value d0. In general, the error rate is higher as the SNR is lower, and the error rate is lower as the SNR is higher.

Figure 5:
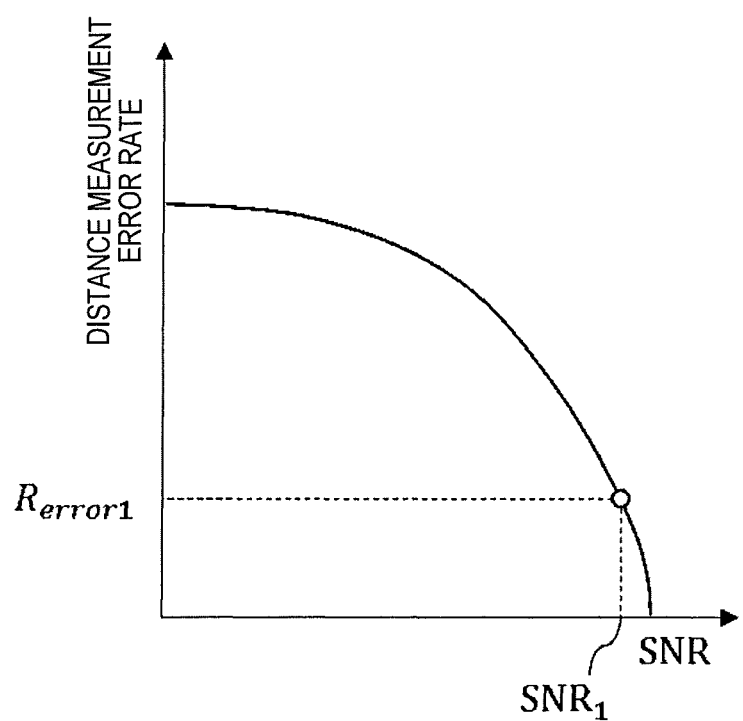
FIG. 5 is a graph for illustrating a signal-to-noise ratio (SNR) and an error rate of distance measurement.

FIG. 5 illustrates, as an example, a relationship between the SNR and the error rate in the present embodiment. In the present embodiment, the control unit 111 sets an $SNR_1$ that satisfies an error rate $R_{error1}$ in advance.

A distance de, which is a value obtained by estimating the true value d0 from those values and the formula (3), is expressed as a formula (4).

$$d_e = \sqrt{\frac{\frac{N_{LD}(0)}{SNR_1}}{N_{AM}}} \quad (4)$$

The distance de can be calculated by estimating the ambient light intensity NAM. By calculating the distance de, the control unit 111 can obtain ToFe using the formula (1). The ToFe is a value obtained by estimating ToF. The control unit 111 determines the data generation range on the basis of the ToFe.

For example, in the case of FIG. 2, the intensity of the ambient light is estimated to be NAMave1. The control unit 111 calculates a distance de1 using the intensity NAMave1 and the formula (4). The control unit 111 calculates $ToF_{e1}$ from the distance de1 and the formula (1). In the present embodiment, the control unit 111 sets the ToFe as the end point of the data generation range T1. In other words, $t_{end1}$ and $ToF_{e1}$ are the same value.

Similarly, in the case of FIG. 4, the intensity of the ambient light is estimated to be NAMave2. The control unit 111 calculates a distance de2 using the intensity NAMave2 and the formula (4). The control unit 111 calculates $ToF_{e2}$ from the distance de2 and the formula (1). In the present embodiment, the control unit 111 sets the ToFe as the end point of the data generation range T2. In other words, $t_{end2}$ and $ToF_{e2}$ are the same value.

As described above, the control unit 111 determines the data generation ranges T1 and T2, and commands the generation unit 113.

Note that the method of determining the data generation range described above is exemplary, and is not limited thereto. The electronic apparatus 100 according to the present embodiment can also be applied to a data generation range determined by different methods.

While the present embodiment has been described as above, various modifications can be implemented and executed. Hereinafter, variations of the operation of the electronic apparatus 100 will be described. For example, in the present embodiment, the control unit 111 transmits a command related to measurement of the ambient light intensity in step S101. The control unit 111 is also capable of optionally determining the ambient light measurement range $T_{NAM}$ and issuing a command besides the present embodiment. As a variation, for example, the control unit 111 may transmit, to the measurement unit 112, the time zone from the time $TD_0$ to the time $TD_2$ illustrated in FIG. 2 as the ambient light measurement range $T_{NAM}$.

Furthermore, the control unit 111 may determine the end point of the ambient light measurement range $T_{NAM}$ at time after the time $TD_2$ at which the light source 101 emits the pulsed light.

In the present embodiment, the measurement unit 112 measures the intensity of light within the ambient light measurement range $T_{NAM}$ in step S102, and transmits, as the intensity of ambient light, the average value NAMave1 to the control unit 111. As a variation, the intensity of the ambient light may be a value obtained by performing statistical processing, such as the maximum value, the average value, and the median value within the ambient light measurement range $T_{NAM}$. Further, the measurement unit 112 may transmit a combination thereof to the control unit 111.

For example, the measurement unit 112 may estimate, as the intensity of the ambient light, the maximum value ($T_{NAMmax1}$) of the intensity within the ambient light measurement range $T_{NAM}$ and the average value NAMave1, and may transmit it to the control unit 111. In step S103, the control unit 111 may determine the data generation range T1 on the basis of the average value NAMave1, and may determine the threshold value $S_{t1}$ on the basis of the maximum value $T_{NAMmax1}$.

While the control unit 111 commands the light source 101, the generation unit 113, and the calculation unit 114 in step S103 in the present embodiment, it may issue commands at partially different timings. For example, the control unit 111 transmits, to the light source 101, a command related to pulsed light to be emitted by the light source 101. In the same step, the control unit 111 issues a command regarding the data generation range T1 to the generation unit 113. In the same step, the control unit 111 issues a command regarding the threshold value $S_{t1}$ to the calculation unit 114.

As a variation, a command of the threshold value $S_t$ may be provided after the light source 101 emits first pulsed light.

In the present embodiment, the control unit 111 issues commands to the light source 101, the generation unit 113, and the calculation unit 114 in step S103. As a variation, a command and notification to another component of the electronic apparatus 100 may be further added, a command may be issued with content different from that of the command described, or at least a part of the commands described may not be issued.

Hereinafter, an exemplary command and notification added by the control unit 111 will be described. The control unit 111 may notify the light receiving unit 102 of information regarding pulsed light to be emitted by the light source 101. The information regarding the pulsed light is, for example, a pulse width, emission time, a shape, an emission direction, and the like of the pulsed light.

The control unit 111 may transmit a command to cause the light receiving unit 102 to output, to a specific partner, signals indicating the intensity of light in a predetermined time zone. For example, in the present embodiment illustrated in FIG. 2, the control unit 111 may command the light receiving unit 102 to transmit, to the measurement unit 112, signals indicating the intensity of light in the time zone from the time $TD_0$ to the time $TD_1$. Furthermore, the control unit 111 may command the light receiving unit 102 to transmit, to the generation unit 113, signals indicating the intensity of light in the time zone from the time $TD_2$ to the time $TD_3$.

The control unit 111 may separately transmit, to the generation unit 113, a command to start data generation and a command to terminate data generation without transmitting a command regarding the data generation range T1. That is, in the present embodiment illustrated in FIG. 2, the control unit 111 may transmit, to the generation unit 113, a command to start data generation at the time $TD_2$. Furthermore, the control unit 111 may transmit, to the generation unit 113, a command to immediately start data generation at time $TD_2$. The command to terminate data generation can also be applied in a similar manner to the command to start data generation.

Moreover, as a variation, the light source 101, the measurement unit 112, and the generation unit 113 may set a part of the content of the command described in the present embodiment in advance. Along with this, the commands from the control unit 111 may not be issued partially. For example, the light source 101 may be set to emit rectangular pulsed light with the pulse width PW, and the control unit 111 may issue commands regarding the time at which the pulsed light is emitted and the direction in which the pulse width is emitted.

Further, the measurement unit 112 may set the time length of the ambient light measurement range in advance, and may set the ambient light measurement range $T_{NAM}$ in response to a command to start measurement of light intensity from the control unit 111.

Furthermore, as a variation of the command of the control unit 111, while the data generation range T1 takes the time $TD_2$ as the time 0 that is a start point in the present embodiment, the start point of the data generation range is not limited to the time 0. For example, the light intensity data may be generated including data before the time $TD_2$, or the light intensity data may be generated from time after the time $TD_2$.

In the present embodiment, in step S103, the control unit 111 determines the data generation range T1 to be narrower as the intensity of the ambient light increases. As a variation, the control unit 111 may set one or more threshold values for the intensity of the ambient light, and may determine the data generation range T1 corresponding to the intensity of the ambient light. In that case, even if the intensity of the ambient light increases, the data generation range T1 of the same time length is set until the threshold value is exceeded.

In addition, in the present embodiment, in step S103, the control unit 111 determines the data generation range T1 to be narrower as the intensity of the ambient light increases. It is sufficient to have a tendency as a whole to determine the data generation range T1 to be narrower as the intensity of the ambient light increases. That is, the electronic apparatus 100 can operate even if the data generation range T1 is determined to be wider as the intensity of the ambient light increases in a part of the range of the ambient light intensity.

In the present embodiment, in step S105, the generation unit 113 generates light intensity data and causes the storage 103 to retain them. Since the signals received by the generation unit 113 are digitized, the light intensity data is digital data. As a variation, the generation unit 113 or an optional data writing device may cause the storage 103 to retain analog data. The optional data writing device may be inside or outside the electronic apparatus 100.

Note that, in that case, while being transmitted from the storage 103 to the calculation unit 114, the light intensity data is digitized by the means described in the present embodiment.

Furthermore, in the present embodiment, the generation unit 113 generates the light intensity data with the time $TD_2$ at which the pulsed light is emitted as the time 0 in step S105. The setting of the time in the light intensity data is not limited to the case of the present embodiment. As a variation, time other than zero may be assigned as the time at which the pulsed light is emitted. Taking the present embodiment illustrated in FIG. 2 as an example, the generation unit 113 may generate light intensity data using time between the time $TD_2$ and the time $TD_3$.

Furthermore, in the present embodiment, the generation unit 113 generates the light intensity data in the data generation range T1 commanded by the control unit 111 in step S105. The data generation range T1 is not limited to the present embodiment. As a variation, the generation unit 113 may generate light intensity data not from the time $TD_2$ at which the pulsed light is emitted but from the time $TD_0$ including the ambient light measurement range $T_{NAM}$.

Furthermore, the generation unit 113 may not receive the command of the data generation range T1 from the control unit 111, and may generate light intensity data while the electronic apparatus 100 is in operation. Note that, in the case of performing the variation, the control unit 111 may issue a command regarding the range in which $ToF_1$ is calculated from the light intensity data to the calculation unit 114.

In the present embodiment, the calculation unit 114 receives the notification from the generation unit 113 and calculates $ToF_1$ in step S106. As a variation, the calculation unit 114 may calculate $ToF_1$ in response to a command from the control unit 111. In that case, the generation unit 113 transmits, to the control unit 111, notification indicating that the generation of light intensity data in the data generation range T1 has been complete.

In the present embodiment, the calculation unit 114 calculates $ToF_1$ in step S106, and transmits it to the output unit 104. As a variation, the calculation unit 114 may cause the storage 103 to retain the calculated $ToF_1$. Furthermore, the calculation unit 114 may transmit the $ToF_1$ retained in the storage 103 to the output unit 104 in response to a command from the control unit 111.

In the present embodiment described with reference to FIG. 2, the calculation unit 114 calculates $ToF_1$ using the threshold value $S_{t1}$ in step S106. As a variation, the calculation unit 114 may calculate $ToF_1$ using only the time at which the light intensity is the highest among the light intensity data without setting the threshold value $S_{t1}$.

In the present embodiment, in step S106, the calculation unit 114 calculates $ToF_1$ on the basis of the time at which the light intensity is the highest among the light intensity data. As a variation, the electronic apparatus 100 can operate even if the calculation unit 114 calculates $ToF_1$ not on the basis of the time at which the light intensity is the highest among the light intensity data in the calculation of $ToF_1$. For example, the calculation unit 114 may calculate $ToF_1$ on the basis of, among the light intensity data, time at which the light intensity of the second, third, and so on are received.

Figure 6:
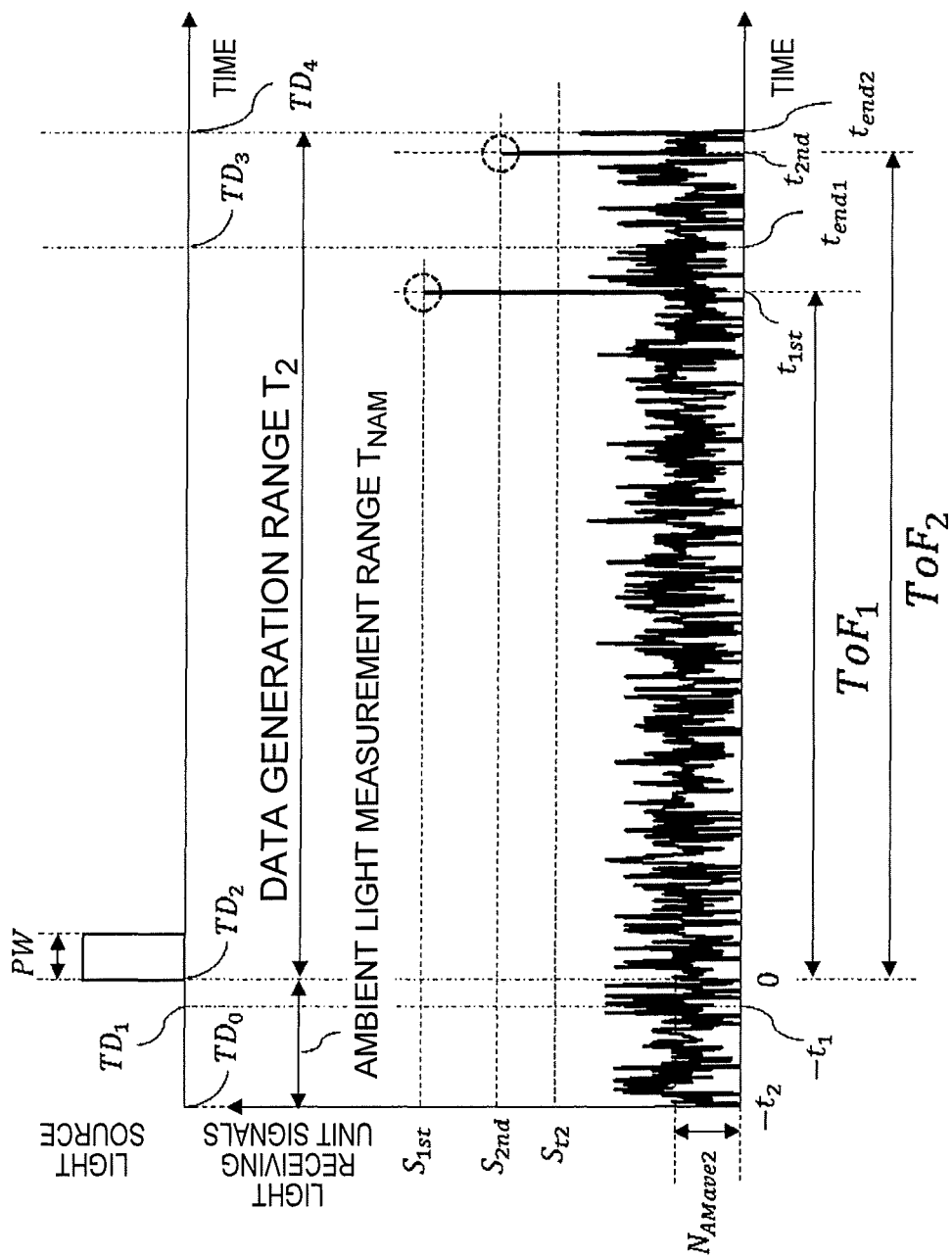
FIG. 6 is a diagram for illustrating calculation of a plurality of times of flight (ToFs)

In the present embodiment, the calculation unit 114 calculates $ToF_1$ in step S106. As a variation, a plurality of ToFs may be calculated. This case will be described with reference to FIG. 6. Since FIG. 6 is a diagram similar to FIG. 4, differences from FIG. 4 will be mainly described.

The calculation unit 114 calculates $ToF_1$ on the basis of, among the light intensity data, the time of the first highest intensity, which is intensity higher than the threshold value $S_{t2}$. Further, the calculation unit 114 calculates $ToF_2$ on the basis of, among the light intensity data, the time of the second highest intensity, which is intensity higher than the threshold value $S_{t2}$.

The reason why the calculation unit 114 calculates a plurality of ToFs will be described below. The pulsed light emitted from the light source 101 slightly spreads as it travels away from the point at which it is emitted. The pulsed light is partially reflected by, instead of the object 200, an object 300 existing at a distance different from that of the object 200, and the reflected light (hereinafter referred to as reflected light 2) is received by the light receiving unit 102 at times.

Therefore, with the calculation unit 114 calculating a plurality of ToFs, it becomes possible to calculate the distance between the object 300 and the electronic apparatus 100 in addition to the distance between the object 200 and the electronic apparatus 100.

As described in the present embodiment, the calculated $ToF_1$ and $ToF_2$ are used to calculate the distance d. Hereinafter, a distance calculated from $ToF_1$ will be referred to as a distance d1, and a distance calculated from $ToF_2$ will be referred to as a distance d2. In a similar manner to the present embodiment, the distance d1 and the distance d2 are transmitted to the output unit 104, and are output to an output destination.

Moreover, although the case where two ToFs are calculated is described in the variation, three or more may be sufficient. Note that, in a similar manner to the present embodiment, the control unit 111 is required to determine a threshold value such that the calculation unit 114 does not calculate ToF on the basis of ambient light.

In the present embodiment, the calculation unit 114 calculates $ToF_1$ on the basis of the threshold value $S_{t1}$ transmitted from the control unit 111 in step S106. While the threshold value $S_{t1}$ is linear, as a variation, the control unit 111 may determine a threshold value using a function, for example. An example of the threshold value using a function will be described with reference to FIGS. 7 to 9.

Figure 7:
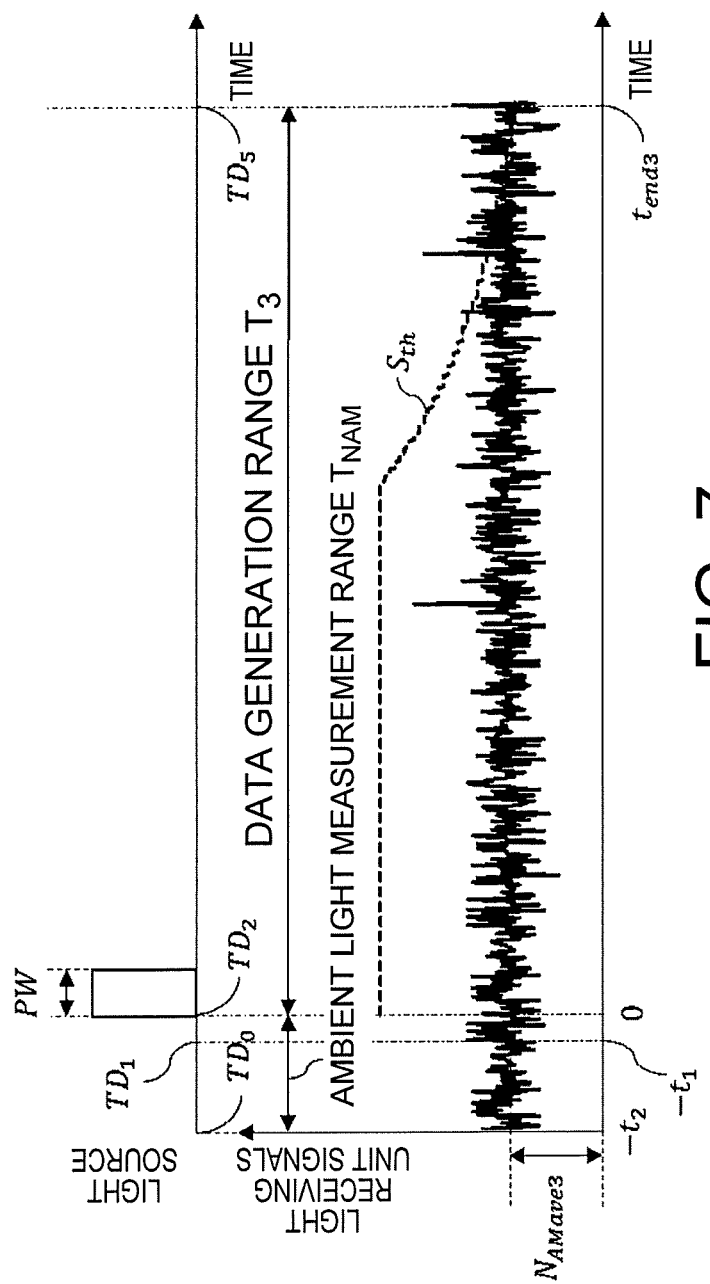
FIG. 7 is a diagram for illustrating the signals output from the light receiving unit and the emission of pulsed light by the light source at a threshold value $S_{th}$.

FIG. 7 illustrates the emission of the pulsed light by the light source 101 and the intensity of light output from the light receiving unit 102. In a similar manner to FIGS. 2 and 4, the intensity of light output from the light receiving unit 102 indicates the intensity of light received by the light receiving unit 102. Note that, in a similar manner to FIGS. 2 and 4, the intensity of light illustrated in FIG. 7 is assumed to be digitized.

In FIG. 7, a threshold value of the intensity of light for determining the reflected light is represented as $S_{th}$. Operations other than the threshold value are similar to those in the present embodiment, and thus description of the operation of the electronic apparatus 100 in the calculation of the distance d will be omitted.

FIG. 7 illustrates that the measurement unit 112 has calculated NAMave3 as the average value of the intensity of the ambient light. In addition, the control unit 111 determines a data generation range T3 from the intensity average value NAMave3. In FIG. 7, the data generation range T3 is represented as a time length $t_{end3}$ from time $TD_2$ to time $TD_5$.

Figure 8:
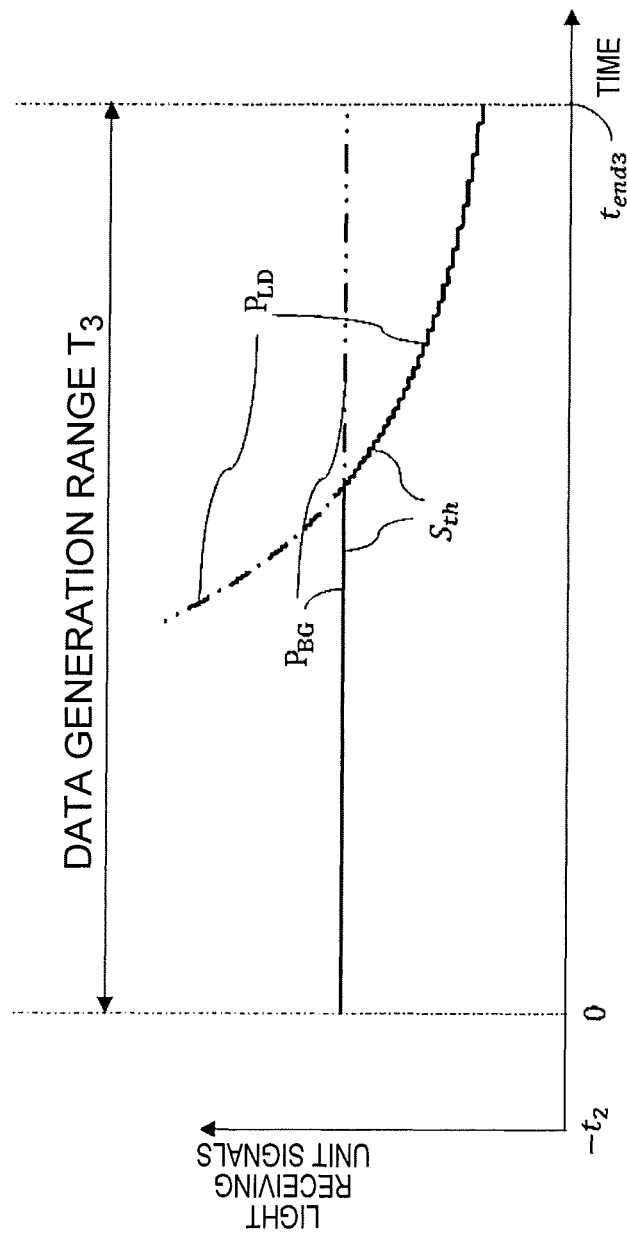
FIG. 8 is a diagram for illustrating the threshold value $S_{th}$.

The threshold value $S_{th}$ will be described with reference to FIG. 8. The threshold value $S_{th}$ is a combination of the lower threshold value of two threshold values PLD and PBG.

The threshold value PLD is a threshold value that attenuates as time passes. As described in the formula (3), the light intensity attenuates in proportion to the square of the distance. With the threshold value PLD that attenuates as time passes being used, even when the true value d0 is large and the reflected light attenuates, possibility that the reflected light can be detected becomes high and possibility that ToF can be calculated becomes high.

The pulsed light used in the present embodiment is generally in a coherent state. The number of emitted photons of the pulsed light in the coherent state follows Poisson distribution. Assuming that the number of photons in reflected light also follows the Poisson distribution, for example, the threshold value PLD is expressed by a formula (5).

$$P_{LD}(X = k) = \frac{M^k}{k!} \exp(-M) \qquad (5)$$

In the case where the average of the intensity (number q of photons) of the ambient light received by the light receiving unit 102 is estimated to be M, the PLD (X=k) is a function (an exponential attenuation function) representing the probability that the intensity (number of photons) of the light received by the light receiving unit 102 is k. Accordingly, the threshold value is a value that varies in accordance with the exponential attenuation function according to the received light intensity. The control unit 111 determines the value of the PLD (X=k) in advance, thereby determining the threshold value PLD as illustrated in FIG. 8.

Meanwhile, with the threshold value PLD alone, in a case where the time from the emission of the pulsed light to the reception of the reflected light is short, intensity exceeding the threshold value PLD is required, whereby it is highly likely that it cannot be determined as reflected light. That is, in a case where the true values d0 of the electronic apparatus 100 and the object 200 are close, it is less likely that the distance d can be calculated. In addition, the threshold value PLD is higher than the intensity of the ambient light, and the effect of removing the ambient light is reduced.

In view of the above, another threshold value PBG is also used. The threshold value PBG is a linear threshold value. With the threshold value PBG being set as a threshold value exceeding the intensity of the ambient light, even when the true value d0 is small, the possibility that the reflected light can be detected becomes high, and the possibility that ToF can be calculated becomes high.

In determining the threshold value PBG, for example, if the number of photons in the ambient light also follows the Poisson distribution, the threshold value PBG is expressed by a formula (6).

$$P_{BG}(X = r) = \frac{Q^r}{r!} \exp(-Q) \qquad (6)$$

In the case where the average of the intensity (number of photons) of the ambient light received by the light receiving unit 102 is estimated to be Q, the PBG (X=r) is a function representing the probability that the intensity (number of photons) of the light received by the light receiving unit 102 is r. The control unit 111 determines the value of the PBG (X=r) in advance, thereby determining the threshold value PBG as illustrated in FIG. 8.

The control unit 111 determines the threshold value $S_{th}$ on the basis of the threshold value PLD and the threshold value PBG described above.

Figure 9:
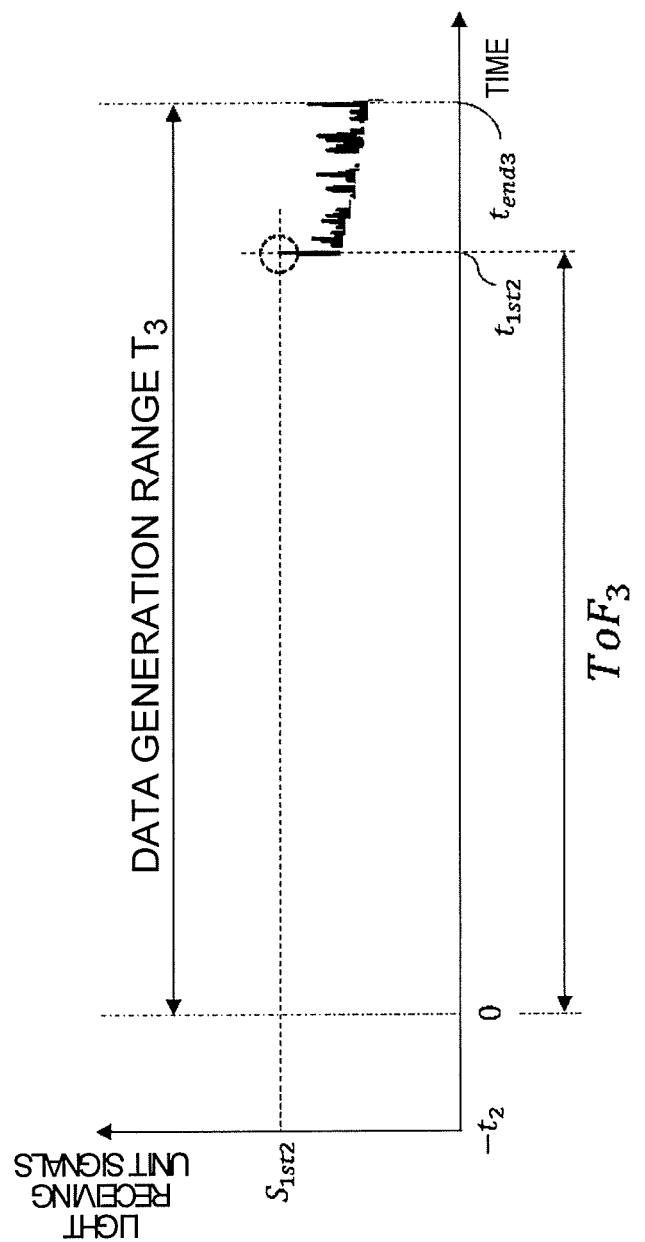
FIG. 9 is a diagram for illustrating an exemplary case where the threshold value $S_{th}$ is applied to the signals output from the light receiving unit.

FIG. 9 illustrates differential data that is equal to or higher than the threshold value $S_{th}$ from the light intensity data. The calculation unit 114 calculates $ToF_3$ on the basis of the time at which the light intensity is the highest among the differences. As described in the variation, it can also be applied to the case where a plurality of ToFs is calculated. The calculation of the distance d from the $ToF_3$, and the output of the distance d are similar to those in the present embodiment, and descriptions thereof will be omitted.

The foregoing has described the variation in which the control unit 111 determines the threshold value $S_{th}$ using a function. The threshold value to be determined by the control unit 111 is optional, and is not limited to the threshold value described in the present embodiment and the variation.

Furthermore, as a variation, the control unit 111 may transmit the threshold value $S_{th}$ to the generation unit 113. The generation unit 113 may cause the storage 103 to retain differential data indicating the light intensity equal to or higher than the threshold value $S_{th}$. With this arrangement, the capacity of the light intensity data can be reduced, and the load on the calculation unit 114 can be reduced.

Note that the method of generating the differential data using the generation unit 113 and causing the storage 103 to retain it is also applicable to the threshold values $S_{t1}$ and $S_{t2}$ described in the present embodiment.

In the present embodiment, the output unit 104 outputs information including the distance d in step S108. As a variation, the output unit 104 may receive the ToF from the calculation unit 114, and may output it as information including the ToF. Further, the output unit 104 may combine and output information including the distance d and information including the ToF.

In the present embodiment, the output unit 104 outputs the information including the distance d transmitted from the calculation unit 114 in step S108. As a variation, the output unit 104 may receive a command from the control unit 111 and output the information including the distance d.

The foregoing has described the variations of the operation of the electronic apparatus 100. Next, variations of the configuration of the electronic apparatus 100 will be described.

The electronic apparatus 100 according to the present embodiment includes the storage 103 inside. The storage 103 does not necessarily have to be provided inside the electronic apparatus 100. A storage device similar to the storage 103 may be provided outside the electronic apparatus 100, or a cloud via the Internet may be used. Note that, in the case of using a cloud, the electronic apparatus 100 may include a communication unit connected to the Internet.

The electronic apparatus 100 according to the present embodiment includes the light receiving unit 102. As a variation, the light receiving unit 102 may include a light condensing unit. The light condensing unit assists the light reception by the light receiving unit 102. For example, a convex lens is used for the light condensing unit. The convex lens may be a single lens or may be a compound lens.

Furthermore, in the present embodiment, the method in which the control unit 111 determines the data generation range on the basis of the ambient light intensity and the reflectivity of the object 200 has been described. As a further variation, the control unit 111 may determine the data generation range on the basis of, in addition to the ambient light intensity and the reflectivity of the object 200, an attenuation rate of light by the light condensing unit.

Figure 10:
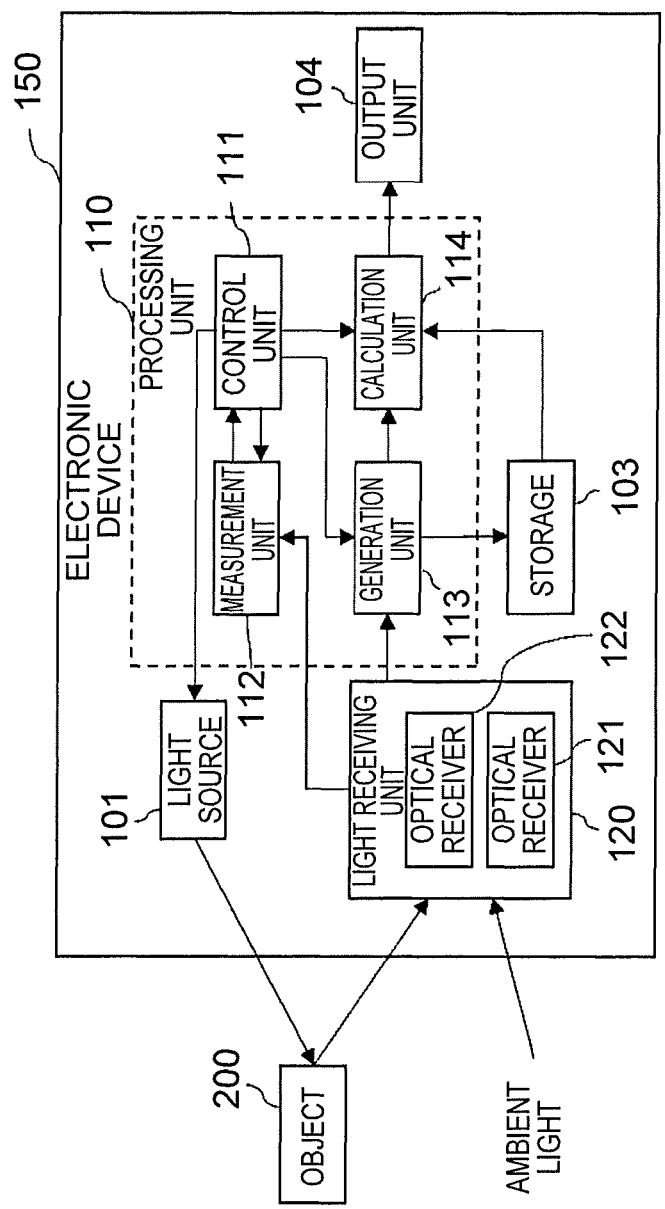
FIG. 10 is a diagram of a distance measurement system including an electronic apparatus that can be applied to the first embodiment.

The electronic apparatus 100 according to the present embodiment includes the light receiving unit 102. As a variation, the light receiving unit 102 may be configured by a plurality of independent optical receivers. Such an electronic apparatus 150 will be described as an example with reference to FIG. 10. A light receiving unit 120 included in the electronic apparatus 150 includes two optical receivers 121 and 122. Each of the optical receivers 121 and 122 has a function similar to that of the light receiving unit 102 described in the present embodiment. Note that, among components of the electronic apparatus 150, components similar to those of the electronic apparatus 100 are denoted by same reference signs, and descriptions thereof will be omitted.

In the present embodiment, the same light receiving unit 102 performs light reception in measurement of ambient light and light reception in data generation. In the variation, the optical receiver 121 receives light in the measurement of ambient light, and the optical receiver 122 receives light in the data generation.

Since the operation of the electronic apparatus 150 in calculating the distance d is similar to the operation of the electronic apparatus 100, differences will be mainly described. In the variation, the control unit 111 also transmits a command to the light receiving unit 120.

In step S101, the control unit 111 also issues a command regarding the ambient light measurement range $T_{NAM}$ to the optical receiver 121, and commands it to transmit signals indicating the intensity of light in the ambient light measurement range $T_{NAM}$ to the measurement unit 112.

In step S102, the optical receiver 121 transmits the signals indicating the intensity of light in the ambient light measurement range $T_{NAM}$ to the measurement unit 112.

In step S103, the control unit 111 also issues a command regarding the determined data generation range T1 to the optical receiver 122, and commands it to transmit signals indicating the intensity of light in the data generation range T1 to the generation unit 113.

In step S105, the optical receiver 122 transmits the signals indicating the intensity of light in the data generation range T1 to the generation unit 113.

The foregoing has described the differences with the operation of the electronic apparatus 100 described in the present embodiment. In the variation, the optical receiver 121 for measuring ambient light and the optical receiver 122 for generating data are divided. With this arrangement, the ambient light measurement range $T_{NAM}$ can be set shorter than in the present embodiment. The electronic apparatus 150 is capable of increasing the frequency of calculating the distance d, which leads to the improvement in the accuracy of the distance d.

In the present embodiment, in step S103, the control unit 111 issues a command such that the time at which the light source 101 emits the pulsed light and the time at which the generation unit 113 starts the data generation are the same time. As a variation, the pulsed light emitted from the light source 101 may be partially reflected, and a command to start the data generation may be transmitted to the generation unit 113 upon reception of the light. In the variation, the command to start data generation is immediately after the light source 101 emits the pulsed light.

Figure 11:
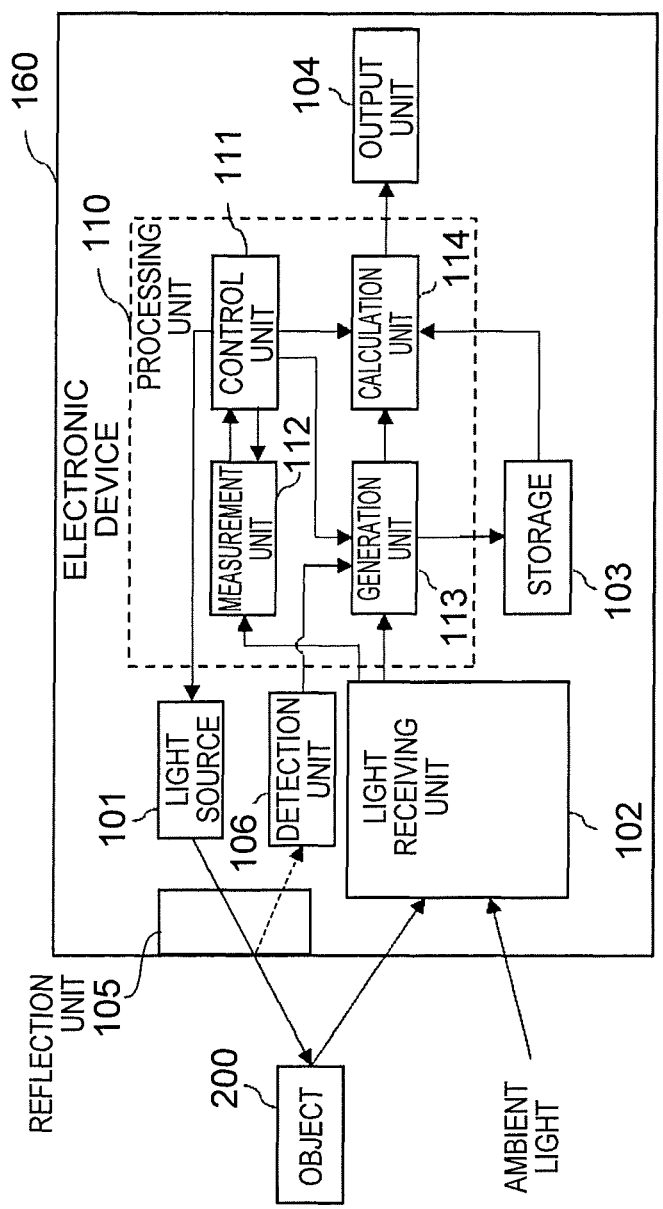
FIG. 11 is another diagram of the distance measurement system including the electronic apparatus that can be applied to the first embodiment.

Such an electronic apparatus 160 will be described as an example with reference to FIG. 11. In addition to the electronic apparatus 100, the electronic apparatus 160 includes a reflection unit 105, and a detection unit 106. Among components included in the electronic apparatus 160, the components included in the electronic apparatus 100 are denoted by the same reference signs, and descriptions thereof will be omitted.

The reflection unit 105 partially reflects the pulsed light emitted from the light source 101, and transmits the remaining pulsed light.

The detection unit 106 detects the pulsed light reflected by the reflection unit 105, and transmits, to the generation unit 113, signals indicating that the light source 101 has emitted the pulsed light. The generation unit 113 that has received the signals starts to generate data. As the detection unit 106, the device described in the light receiving unit 102 is applicable. Note that, in the variation, the control unit 111 does not transmit, to the generation unit 113, a command related time at which data generation is to be started.

The operation of the electronic apparatus 160 is the same as the operation of the electronic apparatus 100 described in the present embodiment except that the detection unit 106 transmits a command to start data generation to the generation unit 113, and thus descriptions thereof will be omitted.

Further, the detection unit 106 may detect the pulsed light reflected by the reflection unit 105, and may transmit a command to start data generation to the generation unit 113. Furthermore, the detection unit 106 may transmit, to the control unit 111, signals indicating that the light source 101 has emitted the pulsed light or a command to start data generation.

The control unit 111 that has received the signals or the command may transmit it to the generation unit 113 to start data generation. In the case where the signals or the command are not received from the detection unit 106 even when a predetermined period of time has elapsed from the time of the pulsed light emission, the control unit 111 may restart from step S103, or may cause the output unit 104 to output information notifying the user of an error.

With this arrangement, it becomes possible to cope with the case where the light source 101 does not emit pulsed light due to failure or the like.

The operation in the processing unit 110 described in the present embodiment and the variation may be implemented by a program being processed. For example, a general-purpose computer incorporating the program may be caused to perform the operation in the processing unit 110.

The program may be stored and provided in a computer readable storage medium, such as a compact disc read-only memory (CD-ROM), a memory card, a CD recordable (CD-R), and a digital versatile disk (DVD), as a file in an installable or executable format. Furthermore, the program may be stored in a computer connected to a network, such as the Internet, to be provided via the network, or may be incorporated and provided in a storage medium, such as a ROM, a hard disk drive (HDD), and a solid state drive (SSD).

The present embodiment and the variations have been described above. Next, examples of application of the electronic apparatus 100 described in the present embodiment will be described below.

In the present embodiment, the electronic apparatus 100 calculates the distance d to the object 200. As an example of application, the electronic apparatus 100 emits pulsed light in various directions and receives reflected light to calculate ToF, thereby making it possible to create a layout showing the arrangement of objects around the electronic apparatus 100.

Figure 12:
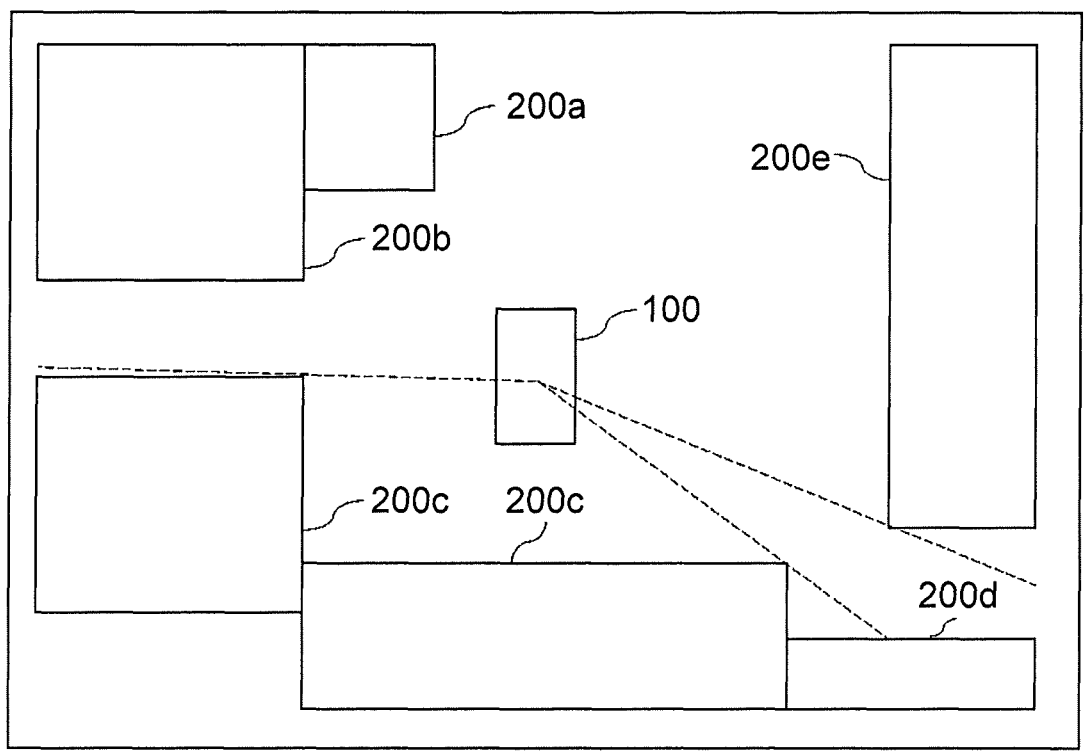
FIG. 12 is a diagram for illustrating arrangement of objects in two dimensions.

A case where the electronic apparatus 100 creates the layout will be described with reference to FIG. 12. In FIG. 12, objects 200a to 200e are arranged around the electronic apparatus 100.

The electronic apparatus 100 emits pulsed light in various directions, and calculates the distances between the electronic apparatus 100 and the objects 200a to 200e in a similar manner to the present embodiment. The calculation unit 114 creates a layout showing the arrangement of the surrounding objects on the basis of the distance.

Figure 13:
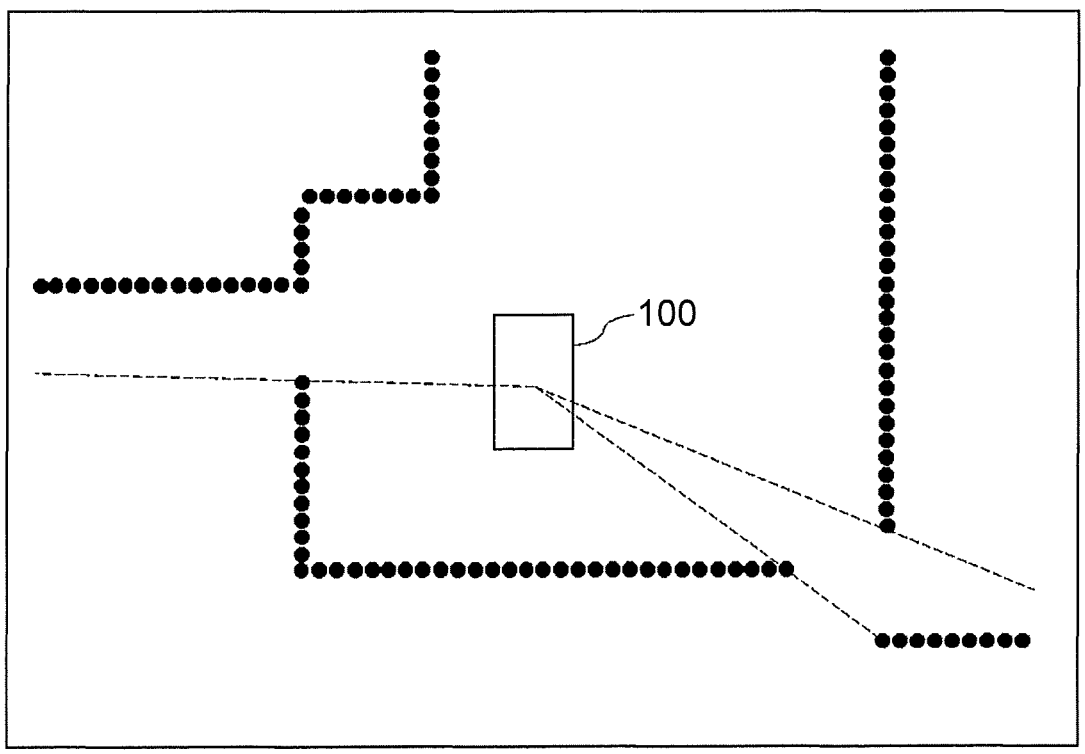
FIG. 13 is a diagram for illustrating a layout of objects in two dimensions.

An example of the created layout is illustrated in FIG. 13. The calculation unit 114 can plot points at the coordinates of the objects 200a to 200e to create a layout of the objects 200a to 200e.

Information regarding the coordinates included in the points may be orthogonal coordinates, polar coordinates, absolute coordinates (world coordinates), or relative coordinates. As the relative coordinates, for example, the center of gravity of the electronic apparatus 100 may be used as a reference, or the position of the light source 101 may be used as a reference. In addition, a means for displaying the information regarding the coordinates is not limited to points, but may be vectors.

In the layout, for example, a mobile object that performs autonomous operation, on which the electronic apparatus 100 is mounted, is used to control a power unit. In addition, by adding location information to the layout and using it as obstacle data, the mobile object that performs autonomous operation can easily obtain the data to use it. The acquisition of the location information can use an existing method.

Although the layout illustrated in FIG. 13 is a plane surface, a three-dimensional space (real space) at three-dimensional points may be shown. An example of the layout in the three-dimensional space will be described with reference to FIGS. 14 and 15.

Figure 14:
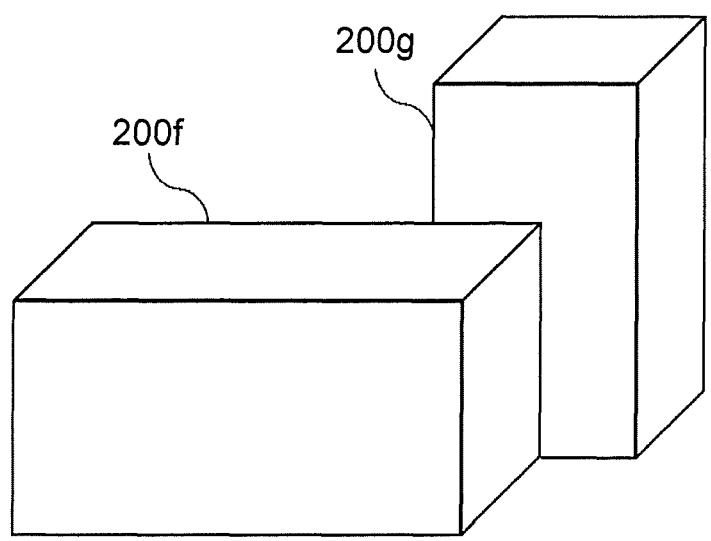
FIG. 14 is a diagram for illustrating arrangement of objects in three dimensions.
Figure 14:
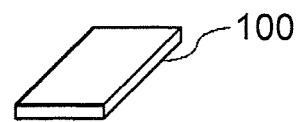

FIG. 14 illustrates that objects 200f and 200g are arranged around the electronic apparatus 100. The electronic apparatus 100 emits pulsed light in various directions, and calculates the distances between the electronic apparatus 100 and the objects 200f and 200g in a similar manner to the present embodiment. The calculation unit 114 creates a layout showing the arrangement of the surrounding objects on the basis of the distance.

Figure 15:
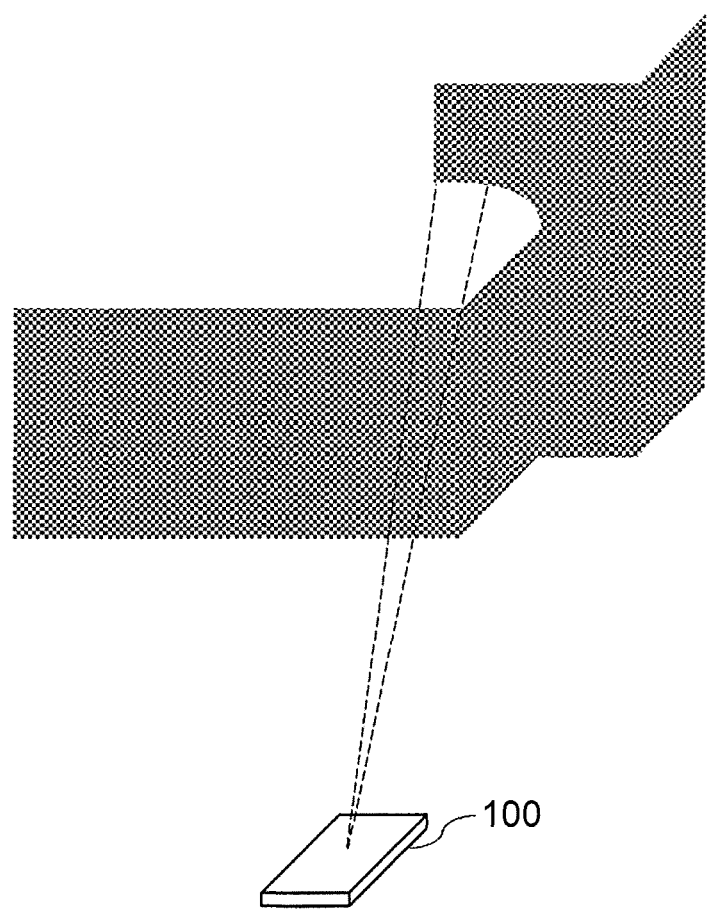
FIG. 15 is a diagram for illustrating a layout of objects in three dimensions.

An example of the created layout is illustrated in FIG. 15. The calculation unit 114 can plot points at the coordinates of the objects 200f and 200g to create a layout of the objects 200f and 200g.

In a similar manner to the case of the two-dimensional layout, information regarding the coordinates included in the three-dimensional points may be orthogonal coordinates, polar coordinates, absolute positions (world positions), or relative positions. As the relative positions, for example, the center of gravity of the electronic apparatus 100 may be used as a reference, or the position of the light source 101 may be used as a reference. In addition, a means for displaying the information regarding the coordinates is not limited to three-dimensional points, but may be three-dimensional vectors.

In a similar manner to the two-dimensional layout, in the three-dimensional layout as well, location information may be added to be used as obstacle data.

The calculation unit 114 may transmit the created layout to the output unit 104, or may cause the storage 103 to retain it. In a similar manner to the distance d described in the present embodiment, the output unit 104 outputs it to an output destination.

Furthermore, an example of application of the layout is not limited to the position of an object. For example, a state in vivo can be expressed in a three-dimensional view when it is applied to an endoscope, and a state of a construction can be expressed in a two-dimensional view or a three-dimensional view when it is applied to a construction. The state in vivo is, for example, the arrangement of organs, the presence or absence of swellings, depressions, holes, and tumors, and the like. The state of a construction is, for example, no abnormality, cracks, unevenness, holes, deflection, and the like. Note that those examples are also included in the layout.

Figure 16:
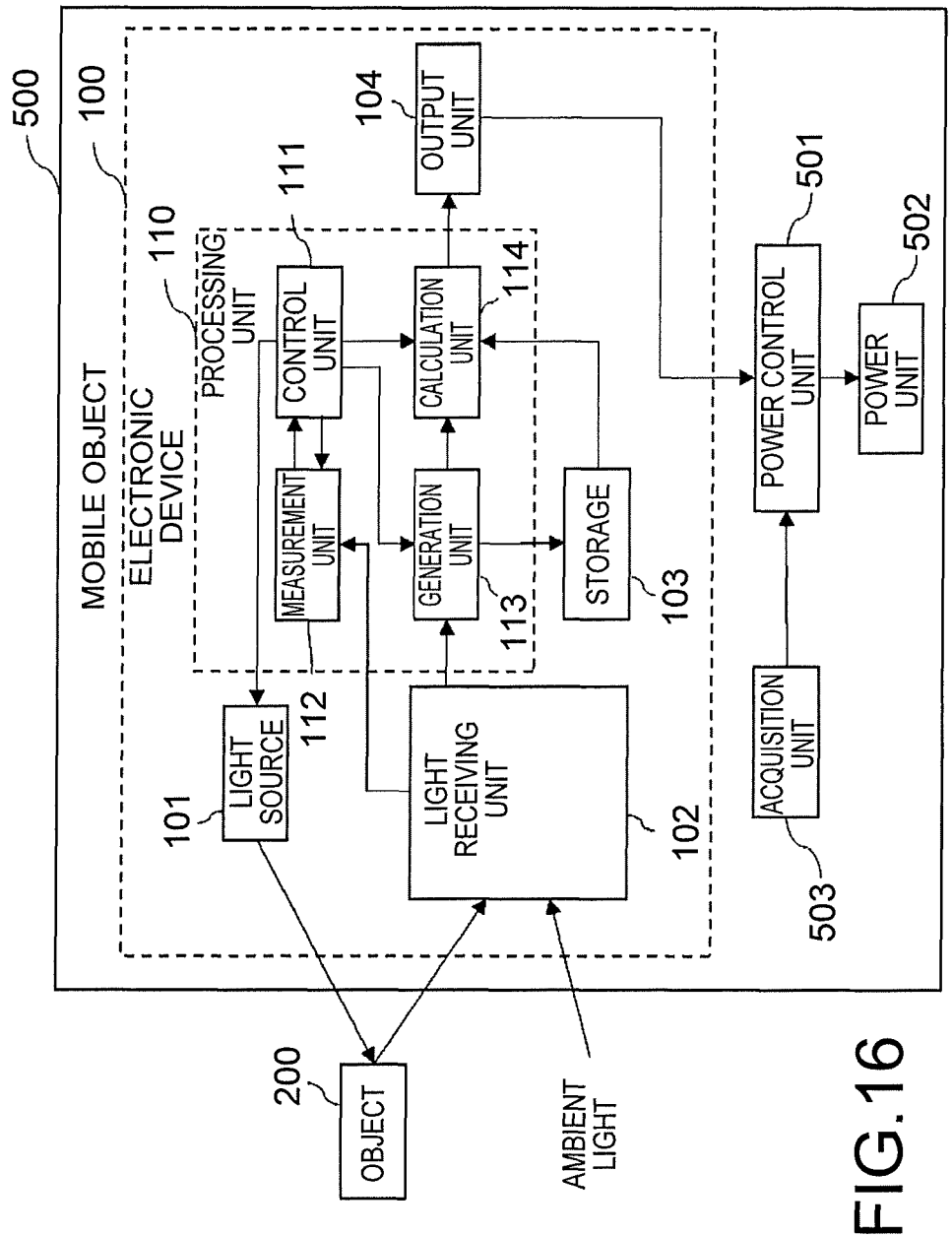
FIG. 16 is a configuration diagram of a mobile object including the electronic apparatus.

As a further example of application, a mobile object that moves using the layout will be described. An example of the mobile object is illustrated in FIG. 16. A mobile object 500 is a movable object, which is, for example, a vehicle, a wagon, a flyable object (manned plane and unmanned plane (e.g., unmanned aerial vehicle (UAV) and drone)), a robot (including an endoscope with a movable distal end), or the like. In addition, the mobile object 500 is, for example, a mobile object that travels through driving operation by a person, or a mobile object capable of automatically (autonomously) traveling without driving operation by a person. An exemplary case where the mobile object 500 is a four-wheeled vehicle capable of autonomously traveling will be described below.

In addition to the electronic apparatus 100, the mobile object 500 includes a power control unit 501, a power unit 502, and an acquisition unit 503. Further, the output unit 104 transmits the layout created by the calculation unit 114 to the power control unit 501.

The power control unit 501 commands the power unit 502 to drive. More specifically, the power control unit 501 determines a direction, speed, and acceleration in which the mobile object 500 moves on the basis of the layout transmitted from the output unit 104 and the information transmitted from the acquisition unit 503, and commands the power unit 502 to drive such that the direction, the speed, and the acceleration are implemented.

By the command of the power control unit 501, an accelerating amount, a braking amount, a steering angle, and the like of the mobile object 500 are controlled. For example, the power control unit 501 controls the drive of the mobile object 500 such that, while objects such as obstacles are avoided, the ongoing lane is maintained and an inter-vehicular distance of a predetermined distance or more is maintained with a preceding vehicle.

The power unit 502 is a driving device mounted on the mobile object 500. The power unit 502 is, for example, an engine, a motor, a wheel, or the like. The power unit 502 is driven by a command of the power control unit 501 to drive the mobile object 500.

The acquisition unit 503 obtains various kinds of information necessary for autonomous traveling. That is, for example, location information of the mobile object 500, an image around the mobile object 500, relative location information transmitted from mobile objects around the mobile object 500, and the like. In order to obtain those various kinds of information, the acquisition unit 503 includes any device such as a millimeter-wave radar sensor, a sonar sensor for detecting an object using sound waves, an ultrasonic sensor, a stereo camera, a monocular camera, and a wired or wireless communication device.

Note that the power control unit 501 is mounted as a processor or the like described in the present embodiment. The power control unit 501 and the acquisition unit 503 may be mounted on one chip, or may be mounted separately. Furthermore, the power control unit 501 and the acquisition unit 503 may be incorporated in the electronic apparatus 100. In that case, the power control unit 501 may be incorporated in the processing unit 110.

As described above, the mobile object 500 is capable of autonomously traveling while avoiding objects, such as obstacles, at least on the basis of the layout showing the arrangement of objects created by emitting pulsed light and receiving reflected light.

While the case of a four-wheeled vehicle capable of autonomously traveling has been described in the example of application, it is also possible to autonomously travel in a similar manner even in the case of other mobile objects mentioned as examples of the mobile object 500, although the power unit 502 is different.

For example, in the case where the mobile object 500 is a drone, the power unit 502 is a motor that rotates blades, and a motor that adjusts the angles of the blades. The power control unit 501 determines a rotating speed of the motor that rotates the blades, an angle of the motor that adjusts the angles of the blades, acceleration of each motor, and the like on the basis of the layout and the acquisition unit 503, and provides the power unit 502 with a command. The power unit 502 drives on the basis of the command of the power control unit 501, whereby the mobile object 500 can travel autonomously.

For example, in the case where the mobile object 500 is a robot, the power unit 502 is a motor that circles, rotates, and adjusts the angle of at least one of an arm and a leg. The arm is, for example, a robot arm or the like. Furthermore, in the case where the robot is an endoscope with a movable distal end, the movable portion is included in the arm. The leg may be, for example, a leg with a wheel and a joint. The power control unit 501 determines rotating speeds of the motors in the arm and the leg, angles of the motors, acceleration of each motor, and the like on the basis of the layout and the acquisition unit 503, and provides the power unit 502 with a command. The power unit 502 drives on the basis of the command of the power control unit 501, whereby the mobile object 500 can travel autonomously.

While the present embodiment, the variations, and the examples of application have been described above, those may be performed in combination.

Figure 17:
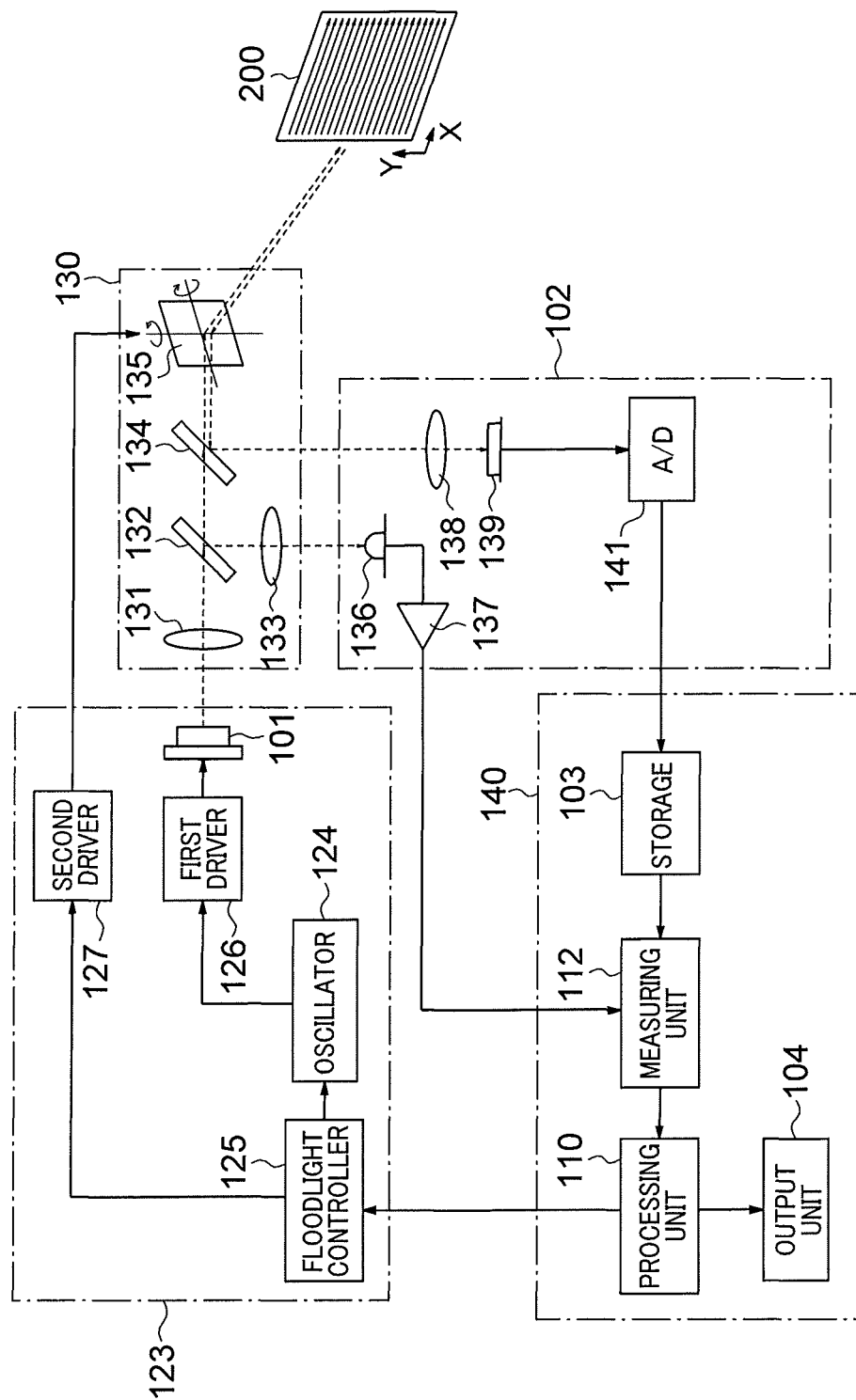
FIG. 17 is a block diagram showing a schematic configuration of a LiDAR apparatus provided with the electronic apparatus according to the present embodiment.

The electronic apparatus 100 according to the present embodiment can be implemented in a LiDAR (Light Detecting And Ranging) apparatus 150 used for autonomous operation or the like. FIG. 17 is a block diagram of showing a schematic configuration of the LiDAR apparatus 150 provided with the electronic apparatus according to the present embodiment.

The electronic apparatus 100 of FIG. 17 includes a floodlight unit 123, a light controlling unit 130, a light receiving unit 102, and a signal processing unit 140. At least part of the electronic apparatus 100 of FIG. 17 can be configured with one or plurality of semiconductor ICs (Integrated Circuits). For example, at least partial components in the signal processing unit 140 may be integrated into one semiconductor chip or the light receiving unit 102 may also be integrated into the semiconductor chip. Moreover, the floodlight unit 123 may also be integrated into the semiconductor chip.

The floodlight unit 123 emits the above-described pulsed lights cyclically as flood lights. The time from when the floodlight unit 123 emits the first pulsed light until the floodlight unit 123 emits the second pulsed light is a period of time equal to or longer than the time required for the light receiving unit 102 to receive reflected light in accordance with the first pulsed light.

The floodlight unit 123 has an oscillator 124, a floodlight controller 125, a light source 101, a first driver 126, and a second driver 127. The oscillator 124 generates an oscillation signal in accordance with the period of emitting the pulsed light as flood lights. The first driver 126 intermittently supplies power to the light source 101 in synchronism with the oscillation signal. The light source 101 intermittently emits the pulsed light on a basis of the power from the first driver 126. The floodlight controller 125 controls the second driver 127 in synchronism with the oscillation signal. The second driver 127 supplies a drive signal to the light controller 130 in synchronism with the oscillation signal in response to a command from the floodlight controller 125.

The light controller 130 controls the travel direction of the pulsed light emitted from the light source 101. Moreover, the light controller 130 controls the travel direction of received pulsed light.

The light controller 130 has a first lens 131, a beam splitter 132, a second lens 133, a half mirror 134, and a scanning mirror 135.

The first lens 131 collects the pulsed light emitted from the floodlight unit 123 and guides them to the beam splitter 132. The beam splitter 132 divides the pulsed light from the first lens 131 in two directions and guides them to the second lens 133 and the half mirror 134 separately. The second lens 133 guides the divided light from the beam splitter 132 to the light receiving unit 102. The reason for guiding the pulsed light to the light receiving unit 102 is that the light receiving unit 102 detects floodlighting timing.

The half mirror 134 passes the divided light from the beam splitter 132 to guide it to the scanning mirror 135. Moreover, the half mirror 134 reflects light including reflected light incident on the electronic apparatus 100 to the direction of the light receiving unit 102.

The scanning mirror 135 rotates the mirror surface in synchronism with a drive signal from the second driver 127 in the floodlight unit 123. In this way, the scanning mirror 134 controls the reflection direction of the divided light incident on the mirror surface of the scanning mirror 134. The second driver 127 functions as a scan controller to scan a direction of the pulsed light within an area having a position of the object. By controlling the rotation of the mirror surface of the scanning mirror 134 at a constant cycle, it is possible to scan the pulsed light emitted from the light controller 130 at least in a one-dimensional direction. By providing two shafts in two directions for rotating the mirror surface, it is also possible to scan the pulsed light emitted from the light controller 130 in a two-dimensional direction. FIG. 17 shows an example of scanning the pulsed light emitted from the electronic apparatus 100 as floodlights in an X-direction and a Y-direction by the scanning mirror 135.

In the case where an object 200, such as a human or an object, is present in a scanning range of the pulsed light emitted from the electronic apparatus 100 as floodlights, the pulsed light are reflected by the object 200. At least part of the reflected light reflected by the object 200 propagates in the reverse direction through the passage almost the same as that of the pulsed light and is incident on the scanning mirror 135 in the light controller 130. Although the mirror surface of the scanning mirror 135 is being rotated at a predetermined cycle, since the pulsed light propagates at the speed of light, the reflected light from the object 200 is incident on the mirror surface while there is almost no change in the angle of the mirror surface of the scanning mirror 135. The reflected light from the object 200 incident on the mirror surface is reflected by the half mirror 134 and received by the light receiving unit 102.

The light receiving unit 102 has a light detector 136, an amplifier 137, a third lens 138, a photo-sensor 139, and an A/D converter 141. The light detector 136 receives light divided by the beam splitter 132 and converts it to an electric signal. The light detector 136 can detect the floodlighting timing of the pulsed light. The amplifier 137 amplifies the electric signal output from the light detector 136.

The third lens 138 forms an image of the light reflected by the half mirror 134 on the photo-sensor 139. The photo-sensor 139 receives light and converts it to an electric signal. The photo-sensor 139 has the above-described SiPM (Silicon Photomultiplier).

The A/D converter 141 samples the electric signal output from the photo-sensor 139 at a predetermined sampling rate for A/D conversion to generate a digital signal.

The signal processing unit 140 measures the distance to the object 200 that reflected the pulsed light and stores a digital signal in accordance with the intensity of received light in a storage 103. The signal processing unit 140 has the storage 103, a measuring unit 112, a processing unit 110, and an output unit 104. The storage 103 stores the digital signal A/D-converted by the A/D-converter 141. The measuring unit 112 reads out a digital signal corresponding to the light received by the light receiving unit 102 from the storage 103 to determine the light receiving timing and determine the distance to the object by means of the time difference from the floodlighting timing to the light receiving timing. The measuring unit 112 detects the floodlighting timing of the floodlight unit 123 via the light detector 136 and the amplifier 137. The floodlight unit 123 may notify the measuring unit 103 of information relating to the pulse widths of the pulse lights.

As described above, the electronic apparatus according to the present embodiment and the electronic apparatus according to the variations measure the intensity of ambient light, and determine a range for generating data for calculating ToF. Accordingly, the influence of the ambient light can be suppressed, and the accuracy of distance measurement can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An electronic apparatus of determining a distance, comprising:
    a light source that emits pulsed lights;
    a receiver configured to receive lights including reflected pulse lights and output a signal indicating intensity of the reception lights; and
    processing circuitry configured to:
    estimate reception intensity of light based on the signal, wherein the reception intensity does not include reflected light reflected by an object;
    determine a period of time during which intensity data of the reflected light is generated, based on the reception intensity and a reflectivity of the reflected light of the object that is a target of distance measurement;
    determine a time-of-flight duration from when the pulsed lights are emitted from the light source until when the lights including the reflected light are received by the receiver, based on the reception intensity in the period of time; and
    determine the distance from the electronic apparatus to the object based on the determined time-of-flight duration.

2. The electronic apparatus according to claim 1, wherein the processing circuitry is configured to:
    determine a threshold value that determines whether the reception lights include the reflected light based on the reception intensity; and
    determine the time-of-flight duration by comparing the reception light with the threshold value.

3. The electronic apparatus according to claim 2, wherein the processing circuitry is configured to determine the threshold value based on the reflectivity of the object that is the target of distance measurement.

4. The electronic apparatus according to claim 2, wherein the threshold value includes an exponential attenuation function.

5. The electronic apparatus according to claim 2, further comprising
    a reflector that partially reflects the pulsed lights; and
    a detector that detects the pulsed lights reflected by the reflector and notifies the processing circuitry of detecting the pulsed lights,
    wherein the processing circuitry is configured to determine the time-of-flight duration based on the notification.

6. The electronic apparatus according to claim 1, wherein when it is assumed that the reception intensity is a first intensity, the time-range period of time corresponding to the first intensity is a first range, and the reception intensity is a second intensity larger than the first intensity, the processing circuitry determines a second range that is a second period of time corresponding to the second intensity to be smaller than the first range.

7. The electronic apparatus according to claim 1, wherein the receiver comprises a light condenser, and
    the processing circuitry is configured to determine the period of time based on an attenuation rate of lights passing through the light condenser.

8. The electronic apparatus according to claim 1, wherein the receiver comprises a first receiver that receives light including the reflected light, and a second receiver that receives light not including the reflected light.

9. The electronic apparatus according to claim 1, wherein
the receiver comprises an avalanche photo diode; and
the signal is output based on a number of photons received by the avalanche photo diode.

10. The electronic apparatus according to claim 1, further comprising:
a storage that retains the signal, wherein
the signal indicates light intensity with respect to time.

11. The electronic apparatus according to claim 1, wherein
the processing circuitry creates a layout including information indicating a coordinate of the object based on at least one of the time-of-flight duration and the distance.

12. The electronic apparatus according to claim 11, further comprising:
a power controller configured to determine a command for a power unit of a mobile object based on the layout.

13. The electronic apparatus according to claim 1, further comprising:
an output unit configured to output at least one of information indicating the distance between the electronic apparatus and the object, and information indicating the time-of-flight duration from when the pulsed lights are emitted until when the light including the reflected light is received.

14. The electronic apparatus according to claim 1, wherein the processing circuitry is configured to determine the period of time as a length of time after the light source emits the pulsed lights during which the intensity data is generated.

15. The electronic apparatus according to claim 1, wherein the processing circuitry is configured to determine a length of the period of time as variable inversely proportional to the reception intensity.

16. The electronic apparatus according to claim 1, wherein the processing circuitry is configured issue a first command to begin generation of the intensity data and issue a second command to end generation of the intensity data, the period of time being from when the first command is issued to when the second command is issued.

17. The electronic apparatus according to claim 1, wherein the processing circuit is configured to detect the reflected light by specifying a peak of the reception light within a measurement range.

18. The electronic apparatus according to claim 1, wherein the processing circuit is configured to estimate the reception intensity of light, wherein the reception intensity of light does not include reflected light reflected by an object, based upon an average intensity value over a measurement time period.

19. A method of determining a distance between an electronic apparatus and an object, comprising:
emitting pulsed lights;
receiving lights including reflected pulse lights and outputting a signal indicating intensity of the reception lights;
estimating reception intensity of light based upon the signal wherein the reception intensity of light does not include reflected light reflected by an object;
determining a period of time during which intensity data of the reflected light is generated, based on the reception intensity and a reflectivity of the reflected light of the object that is a target of distance measurement;
determining a time-of-flight duration from when the pulsed lights are emitted until when the light including the reflected light is received, based on the reception intensity in the period of time; and
determining the distance from the electronic apparatus to the object based on the determined time-of-flight duration.

20. The method according to claim 19, comprising detecting the reflected light by specifying a peak of the reception light within a measurement range.

21. The method according to claim 19, comprising estimating the reception intensity of light, wherein the reception intensity of light does not include reflected light reflected by an object, based upon an average intensity value over a measurement time period.

* * * * *